US012196511B2

(12) United States Patent
Kloepfer et al.

(10) Patent No.: US 12,196,511 B2
(45) Date of Patent: *Jan. 14, 2025

(54) SYSTEMS AND TECHNIQUES FOR MANAGING BIOMETRIC DATA AT AN ELECTROMECHANICAL GUN

(71) Applicant: Biofire Technologies Inc., Broomfield, CO (US)

(72) Inventors: Kai Thorin Kloepfer, Denver, CO (US); Christopher James Owens, Denver, CO (US); Patrick Eduard Moffitt Ekel, Denver, CO (US)

(73) Assignee: Biofire Technologies Inc., Broomfield, CO (US)

( * ) Notice: Subject to any disclaimer, the term of this patent is extended or adjusted under 35 U.S.C. 154(b) by 284 days.

This patent is subject to a terminal disclaimer.

(21) Appl. No.: 17/935,330

(22) Filed: Sep. 26, 2022

(65) Prior Publication Data

US 2023/0304761 A1 Sep. 28, 2023

Related U.S. Application Data

(63) Continuation of application No. 17/656,396, filed on Mar. 24, 2022, now Pat. No. 11,514,735.

(Continued)

(51) Int. Cl.

*F41A 17/06* (2006.01)

*G07C 9/00* (2020.01)

(Continued)

(52) U.S. Cl.

CPC ........ *F41A 17/066* (2013.01); *G07C 9/00563* (2013.01); *G07C 9/26* (2020.01); *G07C 9/29* (2020.01)

(58) Field of Classification Search

CPC ..... F41A 17/066; G07C 9/00563; G07C 9/26; G07C 9/29

See application file for complete search history.

(56) References Cited

U.S. PATENT DOCUMENTS

| | | | |
|---|---|---|---|
| 11,127,013 B1 | 9/2021 | Boyd et al. | |
| 11,301,586 B1 * | 4/2022 | Poh | G06F 21/6254 |

(Continued)

FOREIGN PATENT DOCUMENTS

| | | |
|---|---|---|
| CN | 101459518 B | 4/2011 |
| WO | 2014130625 A1 | 8/2014 |

OTHER PUBLICATIONS

Bhoyar. "Biometric Folder Locking System using Fuzzy Vaul for Face" pp. 1-4, International 1-15 Journal of Computer Applications (0975-8887) vol. 57—No. 3. Online. Nov. 2012.

(Continued)

*Primary Examiner* — Nabil H Syed

(74) *Attorney, Agent, or Firm* — Perkins Coie LLP; Andrew T. Pettit

(57) ABSTRACT

The present disclosure provides systems and techniques for authenticating biometric data while protecting user privacy. Aspects of the present disclosure include collecting biometric query data at a biometric sensor of the gun, generating a set of query features from the biometric query data, each query feature of the set of query features including a first number of dimensions, generating a projection matrix, each element of the projection matrix being drawn independently from an identical distribution having zero mean and unit variance, transforming the set of query features into a transformed set of query features according to the projection matrix, retrieving a transformed set of enrollment features from memory of the gun, identifying a data match based on the transformed set of query features and the transformed set (Continued)

of enrollment features satisfying a similarity threshold, and unlocking the gun in response to the identifying the data match.

15 Claims, 12 Drawing Sheets

Related U.S. Application Data

(60) Provisional application No. 63/165,704, filed on Mar. 24, 2021.

(51) Int. Cl.
*G07C 9/26* (2020.01)
*G07C 9/29* (2020.01)

(56) References Cited

U.S. PATENT DOCUMENTS

| | | | |
|---|---|---|---|
| 2018/0142977 A1 | 5/2018 | Kloepfer et al. | |
| 2019/0222771 A1 | 7/2019 | Hedeen et al. | |
| 2021/0211291 A1 | 7/2021 | Jindal et al. | |
| 2021/0382970 A1 | 12/2021 | Odinokikh et al. | |
| 2024/0160690 A1* | 5/2024 | Ito | G06N 99/00 |

OTHER PUBLICATIONS

Abirami S., et al., “Secure Biometric Authentication System using Chaotic Encryption”, Abirami, S et al. “Secure Biometric Authentication System using Chaotic Encryption” International Research Journal of Engineering and Technology(IRJET), Apr. 2016, vol. 3, Issue 4, pp. 713-718, 2016.

Dwivedi, Rudresh , “A non-invertible cancelable fingerprint template generation based on ridge feature transformation”, Dwivedi, Rudresh et al. “A non-invertible cancelable fingerprint template generation based on ridge feature transformation” Open Access Journal, IEEE Access, vol. 4, 2016, pp. 1-17.

Gupta, Pallav , et al., “Efficient Fingerprint-based User Authentication for Embedded Systems”, Gupta, Pallav et al. “Efficient Fingerprint-based User Authentication for Embedded Systems” Proceedings. 42nd Design Automation Conference, 2005., 2005, pp. 244-247.

Jain, Anil K., et al., “Biometric Template Security”, Jain, Anil K. et al. “Biometric Template Security” EURASIP Journal on Advances in Signal Processing, vol. 2008, Article ID 579416, 17 pages.

Kaur, Harkeerat , et al., “Non-invertible Biometric Encryption to Generate Cancelable Biometric Templates”, Kaur, Harkeerat et al. “Non-invertible Biometric Encryption to Generate Cancelable Biometric Templates” Proceedings of the World Congress on Engineering and Computer Science, vol. I, Oct. 2017, 4 pgs.

Rathgeb, Christian , et al., “A survey on biometric cryptosystems and cancelable biometrics”, Rathgeb, Christian et al. “A survey on biometric cryptosystems and cancelable biometrics” EURASIP Journal on Information Security, 2011, 25 pgs.

Streit, Scott , et al., “Privacy-Enabled Biometric Search”, Streit, Scott et al. “Privacy-Enabled Biometric Search” arXiv, Privacy-Enabled Biometric Search, https://arxiv.org/abs/1708.04726, Aug. 2017, 5 pgs.

Yang Shenglin et al. “A Secure Fingerprint Matching Technique” WBMA ’03, Nov. 2003, 6 pgs.

* cited by examiner

1200

SYSTEMS AND TECHNIQUES FOR MANAGING BIOMETRIC DATA AT AN ELECTROMECHANICAL GUN

CROSS-REFERENCE TO RELATED APPLICATIONS

This application is a continuation of U.S. patent application Ser. No. 17/656,396, titled "SYSTEMS AND TECHNIQUES FOR MANAGING BIOMETRIC DATA AT AN ELECTROMECHANICAL GUN" and filed Mar. 24, 2022, which claims the benefit of priority to U.S. Provisional Application No. 63/165,704, titled "User Authentication" and filed on Mar. 24, 2021, which are incorporated by reference herein in their entireties.

FIELD OF TECHNOLOGY

The teachings disclosed herein generally relate to guns, and more specifically to securely managing biometric data at a gun.

BACKGROUND

The term "gun" generally refers to a ranged weapon that uses a shooting tube (also referred to as a "barrel") to launch solid projectiles, though some instead project pressurized liquid, gas, or even charged particles. These projectiles may be free flying (e.g., as with bullets), or these projectiles may be tethered to the gun (e.g., as with spearguns, harpoon guns, and electroshock weapons such as TASER® devices). The means of projectile propulsion vary according to the design (and thus, type of gun), but are traditionally effected pneumatically by a highly compressed gas contained within the barrel. This gas is normally produced through the rapid exothermic combustion of propellants (e.g., as with firearms) or mechanical compression (e.g., as with air guns). When introduced behind the projectile, the gas pushes and accelerates the projectile down the length of the barrel, imparting sufficient launch velocity to sustain it further towards a target after exiting the muzzle.

Most guns use compressed gas that is confined by the barrel to propel the projectile up to high speed, though the term "gun" may be used more broadly in relation to devices that operate in other ways. Accordingly, the term "gun" may not only cover handguns, shotguns, rifles, single-shot firearms, semi-automatic firearms, and automatic firearms, but also electroshock weapons, light-gas guns, plasma guns, and the like.

Significant energies have been spent developing safer ways to use, transport, store, and dispose guns. Gun safety is an important aspect of avoiding unintentional injury due to mishaps like accidental discharges and malfunctions. Gun safety is also becoming an increasingly important aspect of designing and manufacturing guns. While there have been many attempts to make guns safer to use, transport, and store, those attempts have had little impact.

SUMMARY

The systems, apparatuses, and techniques described herein support securely managing biometric data at a gun. The term "gun," as used herein, may be used to refer to a lethal force weapon, such as a pistol, a rifle, a shotgun, a semi-automatic firearm, or an automatic firearm; a less-lethal weapon, such as a stun-gun or a projectile emitting device; or an assembly of components operable to selectively discharge matter or charged particles, such as a firing mechanism.

Generally, the systems and techniques described herein provide for transforming biometric data and using the transformed biometric data to authenticate a user operating a gun. For example, the gun may collect biometric query data at a biometric sensor, generate a set of query features from the biometric query data, each query feature of the set of query features including a first number of dimensions, generate a projection matrix, each element of the projection matrix being drawn independently from an identical distribution having zero mean and unit variance, transform the set of query features into a transformed set of query features according to the projection matrix, retrieve a transformed set of enrollment features from memory, identify a data match based on the transformed set of query features and the transformed set of enrollment features satisfying a similarity threshold, and transition to an unlocked state in response to identifying the data match. The unlocked state may allow the gun to fire a projectile. For example, in response to the identifying the data match, the gun may activate an actuator of an electromechanical safety mechanism such that the safety mechanism is disengages and allows the gun to fire.

Figure 1:
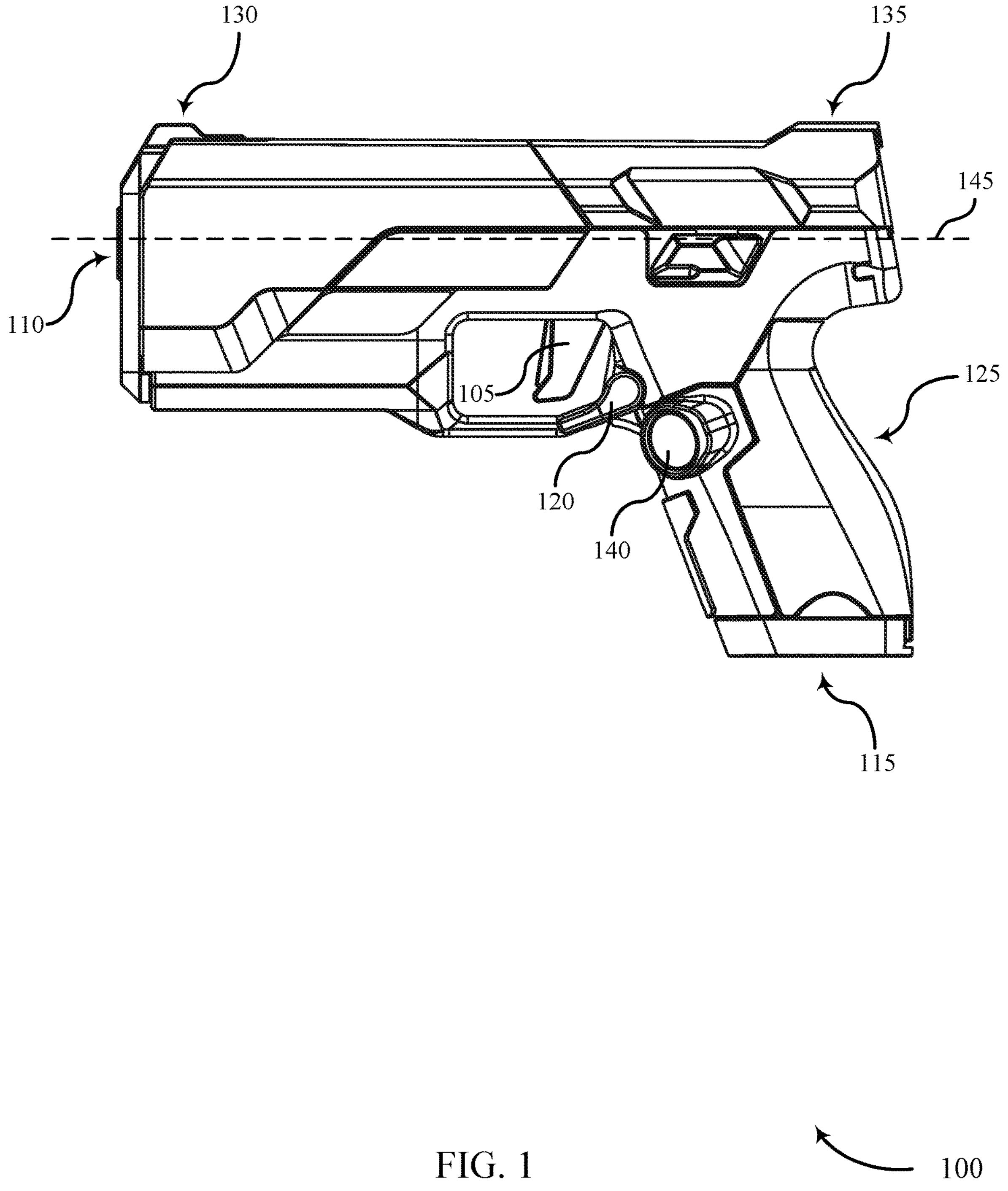
FIG. 1 illustrates an example of a gun that supports managing biometric data in accordance with aspects of the present disclosure.

Various features of the technology described herein will become more apparent to those skilled in the art from a study of the Detailed Description in conjunction with the drawings. Various embodiments are depicted in the drawings for the purpose of illustration. However, those skilled in the art will recognize that alternative embodiments may be employed without departing from the principles of the technology. Accordingly, the technology is amenable to modifications that may not be reflected in the drawings.

DETAILED DESCRIPTION

Some guns use biometric data to authenticate a user. Such a gun may be unlocked in response to successful authenticating the user, and the gun may be operated by the user while in the unlocked state. Using biometric data to authenticate the user is beneficial since biometric features are inherent to the user, and therefore generally considered more unique (and thus secure) than text-based passwords. Moreover, biometric features cannot be forgotten like text-based passwords. But biometric features can change over time, and there are often variations across multiple samples of a single biometric feature, making it difficult to use biometric data to authenticate a user. Additionally, unlike passwords, biometric features cannot be changed in response to a data breech or vulnerability. Therefore, special care should be taken to protect biometric data.

It may be beneficial to transform biometric data and store the transformed data instead of the biometric data itself, so if a data breech or vulnerability arises, the biometric data itself is not comprised. However, transforming biometric data in a secure and reliable manner while preserving the similarity structure of the biometric data is challenging. Traditional hash functions, such as the Secure Hash Algorithm 3 (SHA-3) are useful when transforming text-based passwords, as text-based passwords are precise sequences of characters, but traditional hash functions are of limited usefulness when it comes to transforming biometric data, as traditional hash functions do not preserve the similarity structure of the biometric data, and instead, create vastly different outputs in response to minor variations in the biometric data. Simply put, traditional hash functions are largely unsuitable for transforming biometric data so as to obfuscate its content.

For example, different fingerprints from the same finger may include smudges or illustrate different features of the finger (e.g., ridge bifurcations, ridge terminations, ridge crossovers, etc.), and different images of the same face may be associated with different lighting conditions or facial characteristics (e.g., facial expressions, facial hair, glasses, etc.). Because of these minor variations in biometric samples, a traditional hash function would produce vastly different outputs for two samples of the same biometric feature, thereby making it difficult or impossible to compare hash values to determine whether two biometric samples match. As such, the procedure for generating a transformed version of biometric data should accommodate minor variations in the biometric samples.

Introduced here, therefore, are systems and techniques for transforming biometric data and determining whether a biometric match exists based on the transformed biometric data. The data transformations described herein preserve the similarity structure of the biometric data, thereby allowing matching to be formed in the transformed domain. As such, the original biometric data can be discarded to improve data security and user privacy. As part of an enrollment procedure, the gun may receive biometric data from a user (also referred to as "enrollment data"), transform the enrollment data according to a one-way function, and store the transformed data in non-volatile memory of the gun. As part of an authentication procedure, the gun may receive biometric data from the user (also referred to as "query data"), transform the query data according to the one-way function, and determine whether the transformed query data matches the transformed enrollment data. When the user picks up the gun, the gun may be in a locked state (e.g., inactive), and the gun may be unlocked (also referred to as "activated") in response to determining that the transformed query data matches the transformed enrollment data.

Transformed data can be used to determine whether a biometric match exists since the data transformation techniques described herein preserve the similarly structure of the biometric data and accommodate minor variations in the biometric data. Using transformed data to determine whether a match exists improves data security, as the gun may store the transformed data and refrain from storing the original biometric data, thereby inhibiting the accidental or nefarious acquisition of biometric data. In other words, the gun may store the transformed biometric data in non-volatile memory, and the gun may refrain from storing the original biometric data in non-volatile memory, so any exploitation resulting in acquisition of stored data will not include biometric data.

The data transformation techniques described herein are one-way (e.g., non-invertible), so it is computationally infeasible to derive the original data from the transformed data. A random projection matrix can be used to transform a feature matrix into a lower dimensional subspace while preserving the similarity structure of the feature matrix. The elements of the random projection matrix may be chosen to be orthogonal vectors or approximately orthogonal vectors to preserve the relative distance between points in the original data (as shown by Johnson-Lindenstrauss lemma). Randomly choosing elements can approximate orthogonality as there are many more nearly orthogonal vectors than actual orthogonal vectors in high dimensional space, and randomly choosing elements is more computationally efficient than calculating orthogonal vectors.

Transforming the feature matrix into a random subspace according to the random projection matrix preserves the similarity structure of the feature matrix and produces an underdetermined system of linear equations. Since an underdetermined system of linear equations has fewer equations than unknowns, it is computationally infeasible to calculate the original biometric data even if the transformed biometric data and the random projection matrix become known to an adversary, since the original biometric data is only one solution of infinitely many solutions to the system of linear equations. As an illustrative example, a set of feature vectors "X" is transformed according to a random projection matrix "R" to produce a transformed set of feature vectors "T." This transformation can be described by $T_{k\times N}=R_{k\times d}X_{d\times N}$, where "X" is a set of "N," "d" dimensional data, "R" is the random matrix of "d," "k" dimensional data where "k"<"d," and "T" is the set of "N" data that have undergone a dimensionality reduction. It is computationally infeasible to determine the elements in "X" by solving the system of linear equations T=RX since "k"<"d" (fewer equations than unknowns), making "X" one solution of infinitely many possible solutions.

Since the transformations described herein preserve the similarity structure of the original biometric data, matching can be performed in the transformed domain, thereby allowing the gun to discard the original biometric data. A matching procedure may be performed to determine whether the transformed query data matches transformed enrollment data. The matching procedure may compare the transformed query data against the transformed enrollment data to determine whether the transformed query data corresponds to an authorized user. In other words, the matching procedure may determine whether the transformed query matches transformed enrollment data stored in memory of the gun. As part of the matching procedure, a similarity score may be generated and compared to a similarity threshold. The matching procedure may identify a data match based on the similarity score satisfying the similarity threshold, and the matching procedure may identify a mismatch based on the similarity score satisfying a dissimilarity threshold.

As an illustrative example, the similarity score may be generated by calculating the average cosine similarity between the feature vectors of the transformed query data and the feature vectors of the transformed enrollment data. As another example, a Euclidian distance may be calculated between each vector of the transformed query data and the nearest vector in the transformed enrollment data, the calculated Euclidian distance may be compared against a distance threshold, and the similarity score may be generated by calculating a ratio of the number of features that satisfy the distance threshold as compared to the number of features that do not satisfy the distance threshold.

As part of a user enrollment procedure, the gun (or component thereof, such as a data manager) may receive enrollment data from a user, perform a dimensionality reduction to transform the enrollment data into transformed enrollment data, and store the transformed enrollment data in non-volatile memory of the gun. As part of a user authentication procedure, the gun may receive query data from a user, perform a dimensionality reduction to transform the query data into transformed query data, determine that the transformed query data matches the transformed enrollment data, and transition to an unlocked state in response to determining that the transformed query data matches the transomed enrollment data. In some examples, the gun may transition to the unlocked state by transmitting a signal to an input/output (I/O) pin or to an electrically activated actuator, such as a solenoid-based actuator or a piezoelectric actuator. Since the matching is performed in the transformed domain, the gun may discard the original biometric data, or the gun may refrain from storing the original biometric data.

Embodiments may be described in the context of executable instructions for the purpose of illustration. For example, a processor housed in a gun may be described as being capable of executing instructions that permit the user to be authenticated based on a biometric identifier, such as a fingerprint or iris. However, those skilled in the art will recognize that aspects of the technology could be implemented via hardware, firmware, or software.

Terminology

References in the present disclosure to "an embodiment" or "some embodiments" means that the feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the terms "comprise," "comprising," and "comprised of" are to be construed in an inclusive sense rather than an exclusive or exhaustive sense (i.e., in the sense of "including but not limited to"). The term "based on" is also to be construed in an inclusive sense rather than an exclusive or exhaustive sense. For example, the phrase "A is based on B" does not imply that "A" is based solely on "B." Thus, the term "based on" is intended to mean "based at least in part on" unless otherwise noted.

The terms "connected," "coupled," and variants thereof are intended to include any connection or coupling between two or more elements, either direct or indirect. The connection or coupling can be physical, electrical, logical, or a combination thereof. For example, elements may be electrically or communicatively coupled with one another despite not sharing a physical connection. As one illustrative example, a first component is considered coupled with a second component when there is a conductive path between the first component and the second component. As another illustrative example, a first component is considered coupled with a second component when the first component and the second component are fastened, joined, attached, tethered, bonded, or otherwise linked.

The term "manager" may refer broadly to software, firmware, or hardware. Managers are typically functional components that generate one or more outputs based on one or more inputs. A computer program may include or utilize one or more managers. For example, a computer program may utilize multiple managers that are responsible for completing different tasks, or a computer program may utilize a single manager that is responsible for completing all tasks. As another example, a manager may include an electrical circuit that produces an output based on hardware components, such as transistors, logic gates, analog components, or digital components. Unless otherwise noted, the terms "manager" and "module" may be used interchangeably herein.

When used in reference to a list of multiple items, the term "or" is intended to cover all of the following interpretations: any of the items in the list, all of the items in the list, and any combination of items in the list. For example, the list "A, B, or C" indicates the list "A" or "B" or "C" or "A and B" or "A and C" or "B and C" or "A and B and C."

Overview of Guns

FIG. 1 illustrates an example of a gun 100 that supports systems and techniques for managing biometric data in accordance with aspects of the present disclosure. The gun 100 includes a trigger 105, a barrel 110, a magazine 115, and a magazine release 120. While these components are generally found in firearms, such as pistols, rifles, and shotguns, those skilled in the art will recognize that the technology described herein may be similarly applicable to other types of guns as discussed above. As an example, comparable components may be included in vehicle-mounted weapons that are not intended to be held or operated by hand. While not shown in FIG. 1, the gun 100 may also include a striker (e.g., a ratcheting striker or rotating striker) or a hammer that can be actuated in response to pulling the trigger 105. Pulling the trigger 105 may result in the release of the striker or hammer, thereby causing the striker or hammer to contact a firing pin, percussion cap, or primer, so as to ignite a propellant and fire a projectile through the barrel 110. Embodiments of the gun 100 may also include a blowback system, a locked breech system, or any combination thereof. These systems are more commonly found in self-reloading firearms. The blowback system may be responsible for obtaining energy from the motion of the case of the projectile as it is pushed to the rear of the gun 100 by expanding propellant, while the locked breech system may be responsible for slowing down the opening of the breech of a self-reloading firearm when fired. Accordingly, the gun 100 may support the semi-automatic firing of projectiles, the automatic firing of projectiles, or both.

The gun 100 may include one or more safeties that are meant to reduce the likelihood of an accidental discharge or an unauthorized use. The gun 100 may include one or more mechanical safeties, such as a trigger safety or a firing pin safety. The trigger safety may be incorporated in the trigger 105 to prevent the trigger 105 from moving in response to lateral forces placed on the trigger 105 or dropping the gun. The term "lateral forces," as used herein, may refer to a force that is substantially orthogonal to a central axis 145 that extends along the barrel 110 from the front to the rear of the gun 100. The firing pin safety may block the displacement path of the firing pin until the trigger 105 is pulled. Additionally or alternatively, the gun 100 may include one or more electronic safety components, such as an electronically actuated drop safety. In some cases, the gun 100 may include both mechanical and electronic safeties to decrease the potential for accidental discharges and improve gun safety.

The gun 100 may include one or more sensors, such as a user presence sensor 125 and a biometric sensor 140. In some cases, the gun 100 may include multiple user presence sensors 125 whose outputs can collectively be used to detect the presence of a user. For example, the gun 100 may include a time of flight (TOF) sensor, a photoelectric sensor, a capacitive sensor, an inductive sensor, a force sensor, a resistive sensor, or a mechanical switch. As another example, the gun 100 may include a proximity sensor that is configured to emit an electromagnetic field or electromagnetic radiation, like infrared, and looks for changes in the field or return signal. As another example, the gun 100 may include an audio input mechanism (e.g., a transducer implemented in a microphone) that is configured to generate a signal that is representative of nearby sounds, and the presence of the user can be detected based on an analysis of the signal.

Additionally or alternatively, the gun 100 may also include one or more biometric sensors 140 as shown in FIG. 1. For example, the gun 100 may include a fingerprint sensor (also referred to as a "fingerprint scanner"), an image sensor, or an audio input mechanism. The fingerprint scanner may generate a digital image (or simply "image") of the fingerprint pattern of the user, and the fingerprint pattern can be examined (e.g., on the gun 100 or elsewhere) to determine whether the user should be verified. The image sensor may generate an image of an anatomical feature (e.g., the face or eye) of the user, and the image can be examined (e.g., on the gun 100 or elsewhere) to determine whether the user should be verified. Normally, the image sensor is a charge-coupled device (CCD) or complementary metal-oxide semiconductor (CMOS) sensor that is included in a camera module (or simply "camera") able to generate color images. The image sensor need not necessarily generate images in color, however. In some embodiments, the image sensor is configured to generate ultraviolet, infrared, or near infrared images. Regardless of its nature, images generated by the image sensor can be used to authenticate the presence or identity of the user. As an example, an image generated by a camera may be used to perform facial recognition of the user. The audio input mechanism may generate a signal that is representative of audio containing the voice of the user, and the signal can be examined (e.g., on the gun 100 or elsewhere) to determine whether the user should be verified. Thus, the signal generated by the audio input mechanism may be used to perform speaker recognition of the user. Including multiple biometric sensors in the gun 100 may support a robust authentication procedure that functions in the event of sensor failure, thereby improving gun reliability. Note, however, that each of the multiple biometric sensors may not provide the same degree or confidence of identity verification. As an example, the output produced by one biometric sensor (e.g., an audio input mechanism) may be used to determine whether a user is present while the output produced by another biometric sensor (e.g., a fingerprint scanner or image sensor) may be used to verify the identity of the user in response to a determination that the user is present.

The gun 100 may support various types of aiming sights (or simply "sights"). At a high level, a sight is an aiming device that may be used to assist in visually align the gun 100 (and, more specifically, its barrel 110) with a target. For example, the gun 100 may include iron sights that improve aim without the use of optics. Additionally or alternatively, the gun 100 may include telescopic sights, reflex sights, or laser sights. In FIG. 1, the gun 100 includes two sights—namely, a front sight 130 and a rear sight 135. In some cases, the front sight 130 or the rear sight 135 may be used to indicate gun state information. For example, the front sight 130 may include a single illuminant that is able to emit light of different colors to indicate different gun states. As another example, the front sight 130 may include multiple illuminants, each of which is able to emit light of a different color, that collectively are able to indicate different gun states. One example of an illuminant is a light-emitting diode (LED).

The gun 100 may fire projectiles, and the projectiles may be associated with lethal force or less-lethal force. For example, the gun 100 may fire projectiles containing lead, brass, copper, zinc, steel, plastic, rubber, synthetic polymers (e.g., nylon), or a combination thereof. In some examples, the gun 100 is configured to fire lethal bullets containing lead, while in other cases the gun 100 is configured to fire less-lethal bullets containing rubber. As mentioned above, the technology described herein may also be used in the context of a gun that fires prongs (also referred to as "darts") which are intended to contact or puncture the skin of a target and then carry electric current into the body of the target. These guns are commonly referred to as "electronic control weapons" or "electroshock weapons." One example of an electroshock weapon is a TASER device.

The gun 100 may include a data manager, which may be an example of a processor or a controller as described herein. The gun 100 may collect biometric query data at the biometric sensor 140. The biometric data may be collected from a user (also referred to as an "operator") of the gun 100. The data manager may generate a set of query features from the biometric query data, each query feature of the set of query features including a first number of dimensions, generate a projection matrix, each element of the projection matrix being drawn independently from an identical distribution having zero mean and unit variance, and transform the set of query features into a transformed set of query features according to the projection matrix. The data manager may retrieve a transformed set of enrollment features from memory of the gun 100, identify a data match based on the transformed set of query features and the transformed set of enrollment features satisfying a similarity threshold, and transition to an unlocked state in response to the identifying the data match.

The unlocked state may allow the gun 100 to fire a projectile through the barrel 110. In some examples, in response to the identifying the data match, the gun 100 may activate an actuator (e.g., an electromechanical safety mechanism, an electromechanical firing mechanical, etc.) such that the actuator is displaced and allows the gun 100 to fire. For example, the gun 100 may activate an electromechanical actuator retaining a sear such that the electromechanical actuator releases the sear, causing a firing pin to strike a cartridge primer, which results in the ignition of propellant and the propelling or a projectile (e.g., a bullet) through the barrel 110.

Figure 2:
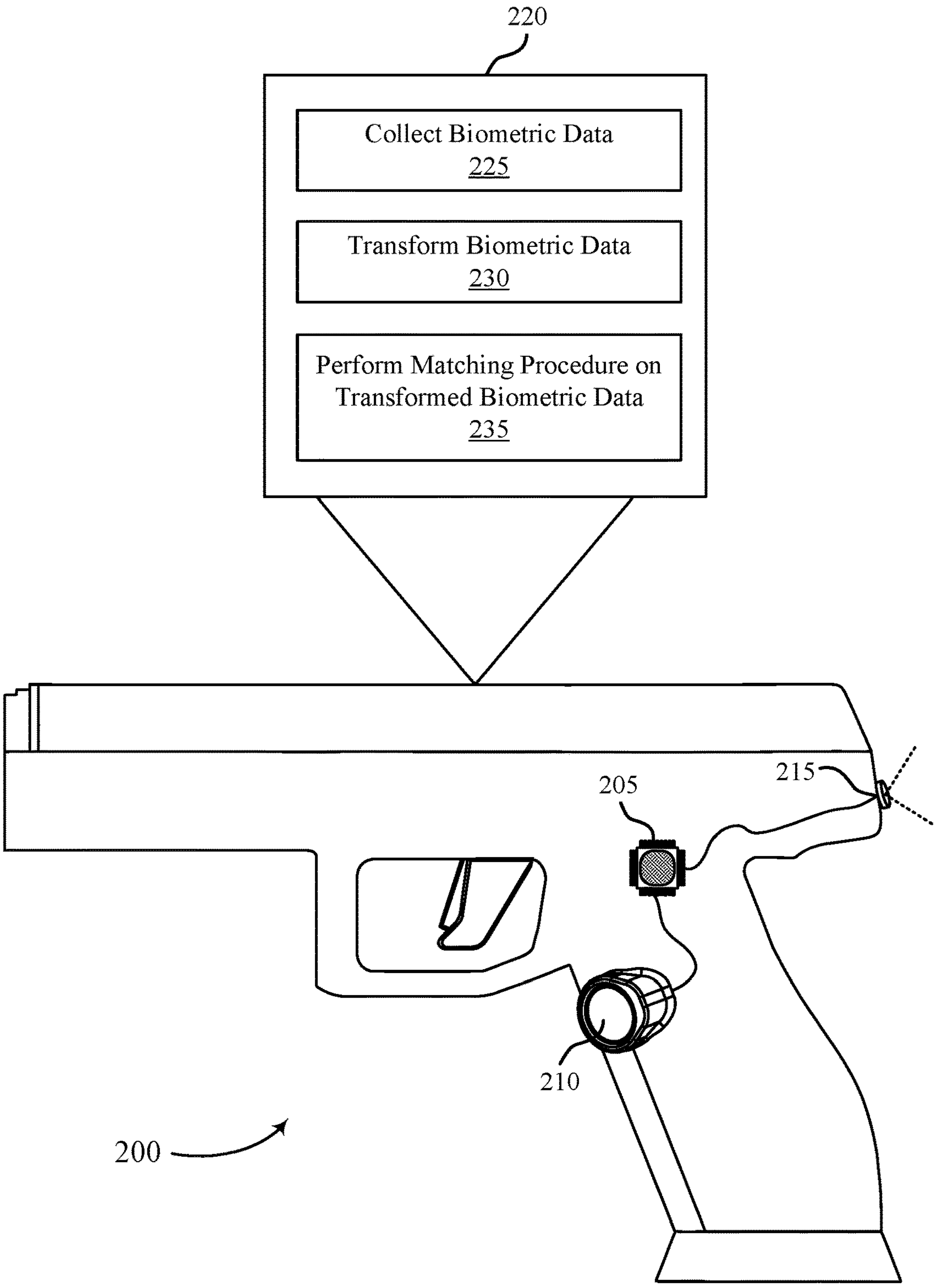
FIG. 2 illustrates an example of a gun that supports managing biometric data in accordance with aspects of the present disclosure.

FIG. 2 illustrates an example of a gun 200 that supports managing biometric data in accordance with aspects of the present disclosure. The gun 200 may use biometric data to authenticate a user, and the gun 200 may be an example of the gun 100 as described with reference to FIG. 1. The gun 200 includes a data manager 205, a fingerprint scanner 210, and a camera 215. The data manager 205 may be electrically coupled with the fingerprint scanner 210 and the camera 215.

The data manager 205 may be an example of a controller described herein. For example, the data manager 205 may include a processor that executes instructions, memory cells that store data, and electrical circuits that carry electrical signals. The data manager 205 may perform aspects of a data authentication procedure 220. For example, the data manager 205 may collect biometric data from one or more sensors of the gun 200, transform the biometric data according to a one-way (e.g., non-invertible) function, and perform a matching procedure to determine whether the transformed query data matches transformed enrollment data stored in memory of the gun 200. Biometric data may be referred to as query data when collected as part of a user authentication procedure, and biometric data may be referred to as enrollment data when collected as part of a user enrollment procedure.

At step 225, the data manager 205 may collect biometric data from a biometric sensor of the gun 200, such as the fingerprint scanner 210 and/or the camera 215. In some examples, the data manager 205 may preprocess the biometric data to reduce the noisiness of the data and enhance the reliability of the data authentication procedure 220. For example, the data manager 205 may perform grayscale transformation, normalization, segmentation, edge detection, orientation prediction, binarization, thinning, feature extraction, or any combination thereof, on the biometric data. The data manager 205 may extract a set of query features from the biometric data, where each query feature of the set of query features includes a first number of dimensions. As an illustrative example, the data manager 205 may extract a set of query features including fingerprint minutiae data, vein pattern data, facial characteristics, image texture, image pixel data, Fisher vectors, eigenvectors, features produced by Gabor wavelets, features produces by Gabor filters (e.g., two dimensional Gabor filters, Ateb-Gabor filters, etc.), or the like.

At step 230, the data manager 205 may transform the biometric data into transformed biometric data. For example, the data manager 205 may transform query data into transformed query data when performing a user authentication procedure, and the data manager 205 may transform enrollment data into transformed enrollment data when performing a user enrollment procedure. The biometric data may be transformed according to a one-way function such that it is computationally infeasible to derive the original biometric data from the transformed biometric data.

The data manager 205 may perform a dimensionality reduction on the biometric data while preserving the similarity structure of the biometric data. For example, the data manager 205 may generate a matrix and project the biometric data into a lower dimensional subspace based on multiplying a biometric data matrix and a random projection matrix. The biometric data matrix may include a set of query features or a set of enrollment features, and the random projection matrix may include elements randomly chosen from a distribution with zero mean and unit variance. The random projection matrix may include vectors that are orthogonal vectors to project biometric data into a lower dimensional subspace, or the random projection matrix may include approximately orthogonal vectors that approximate a projection into a lower dimensional subspace. The approximately orthogonal vectors may include elements independently selected from an identical distribution with zero mean and unit variance. A matrix including orthogonal or approximately orthogonal vectors may be referred to as a projection matrix. Multiplying the biometric data and the projection matrix produces transformed data of lower dimensionality than the original biometric data while preserving the similarity structure of the original biometric data. Reducing the dimensionality of the biometric data improves the security of the biometric data, as the dimensionality reduction is a one-way function, so it is computationally infeasible to derive the original biometric data from the transformed biometric data.

At step 235, the data manager 205 may perform a matching procedure on the transformed biometric data. Since the dimensionality reduction described herein preserves the similarity structure of the biometric data, the original biometric data can be discarded, and the matching can be performed in the transformed domain. The gun 200 can therefore refrain from storing the original biometric data. As part of the matching procedure, the data manager 205 may generate a similarity score and determine that the transformed biometric data matches transformed enrollment biometric data based on the similarity score satisfying a similarity threshold. Similarity scores and similarity thresholds are further discussed herein, such as with reference to FIG. 4 and FIG. 6.

Figure 3:
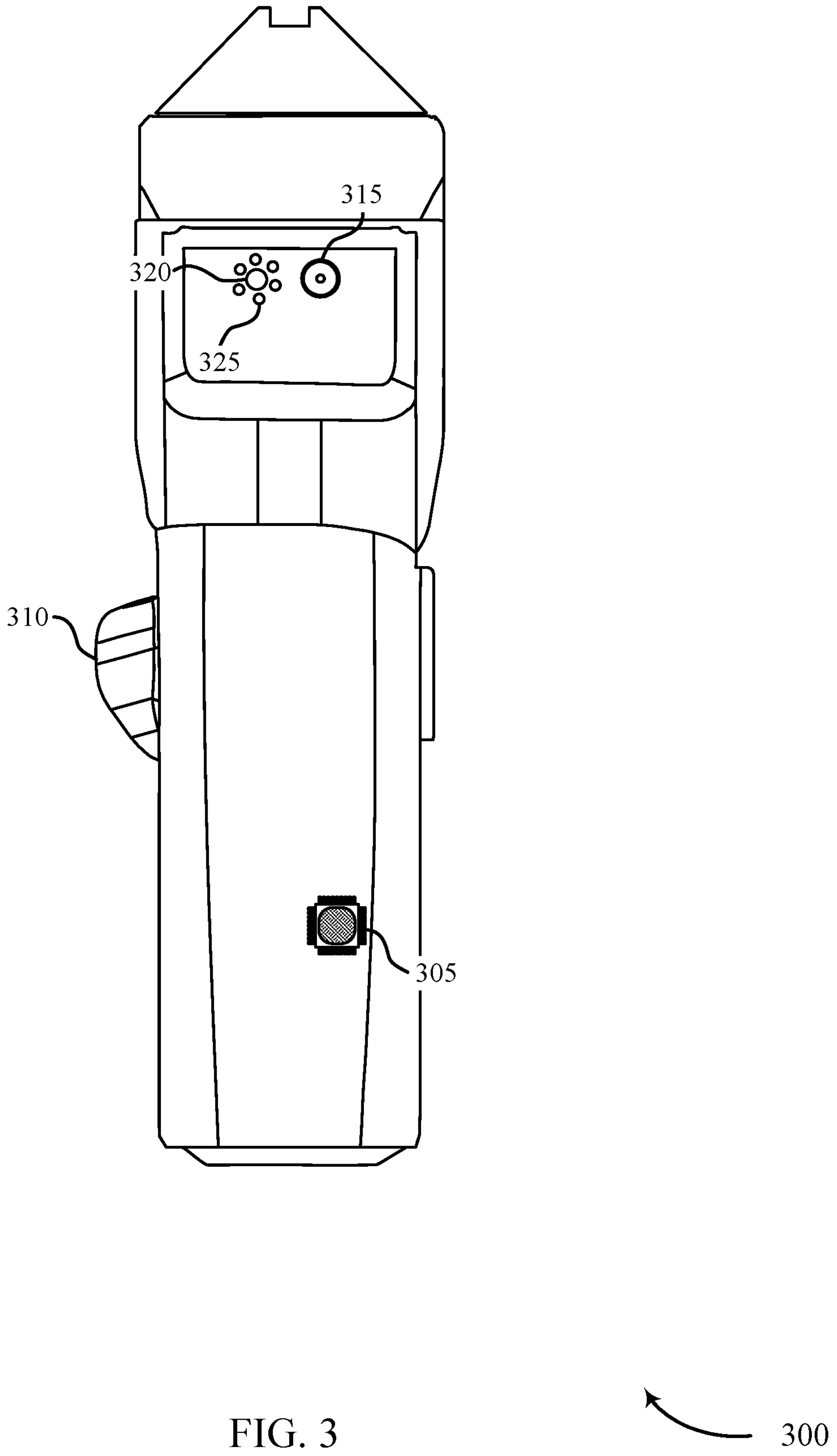
FIG. 3 illustrates an example of a gun that supports managing biometric data in accordance with aspects of the present disclosure.

FIG. 3 illustrates an example of a gun 300 that supports using biometric data to authenticate a user in accordance with aspects of the present disclosure. The gun 300 may be an example of the gun 100 as described with reference to FIG. 1 or the gun 200 as described with reference to FIG. 2. The guns described herein may be unlocked (e.g., activated, enabled, etc.) in response to successfully matching biometric query data to biometric enrollment data stored on the gun. As such, the guns described herein may be referred to as "biometrically enabled" guns.

The gun 300 includes a data manager 305, a fingerprint scanner 310, a camera 315, a dot projector 320, and an illuminator 325. The fingerprint scanner 310 and the camera 315 are examples of biometric sensors of the gun 300, but it should be understood that the gun 300 may include additional or alternative biometric sensors. As an illustrative example, the gun 300 may include a palmprint scanner that collects a sample of a palmprint of the user holding the gun 300, a microphone that collects audio data for speech analysis, a vein pattern scanner that collects a sample of a finger or hand vein mapping of the user holding the gun 300, an image sensor that collects an image of an iris, etc.

The fingerprint scanner 310 supports collecting fingerprint data for use in a user authentication procedure and/or a user enrollment procedure. The fingerprint scanner 310 may include an optical sensor, a capacitive sensor, or an ultrasonic sensor. For example, the fingerprint scanner 310 may include an optical image sensor that uses a complementarity metal-oxide semiconductor (CMOS) sensor and/or a charged coupled device (CCD) sensor, the fingerprint scanner 310 may include a capacitive sensor that uses an array of capacitors, or the fingerprint scanner 310 may include ultrasonic transmitters and receivers. The collected fingerprint data may be used as part of a user enrollment procedure to enroll a user as an authentic or valid user of the gun 300, or the collected fingerprint data may be used as part of a user authentication procedure to determine that the user holding the gun 300 is an authentic or valid user (e.g., an owner of the gun 300, a user that has performed a user enrollment procedure at the gun 300, etc.).

The camera 315 supports collecting facial data for use in a user authentication procedure and/or a user enrollment procedure. The camera 315 may include an infrared camera or a visible light camera that supports collecting facial data from a user. Data obtained from the camera 315 may be used in a two-dimensional or three-dimensional facial recognition procedure. As an example of a three-dimensional facial recognition procedure, the illuminator 325 may include a flood illuminator (e.g., a light-emitting diode (LED)) configured to light up the face of the user, the dot projector 320 may include a laser projector (e.g., a vertical-cavity surface-emitting laser (VCSEL)) configured to project a dot matrix onto the face of the user to generate a depth map of the face, and the camera 315 may include an infrared CMOS sensor configured to generate an infrared image of the face of the user. The depth map and the infrared image may be used in the user authentication procedure to verify the identity of the user. Fingerprint data and facial data are examples of biometric authentication data which may be used in an authentication procedure, but it should be noted that other forms of biometric data may be used, such as palmprint data, vein pattern data, iris data, retina data, heartbeat data, impedance data, electrocardiogram data (EKG), voice data, thermography data, etc.

The data manager 305 may receive biometric data from one or more biometric sensors of the gun 300, transform the biometric data, perform a data matching procedure to determine whether the user is a valid user of the gun 300, and generate an indication of a data match or a data mismatch. The data manager 305 may store the transformed biometric data, and the data manager may 305 discard the original (e.g., non-transformed) biometric data. For example, the data manager 305 may store biometric data in volatile memory (RAM, register, etc.) of the gun, transform the biometric data, store the transformed biometric data in non-volatile memory, and flush the volatile memory (e.g., ROM, Flash, etc.) such that the biometric data is removed from the gun 300. As an illustrative example, the data manager 305 may flush the volatile memory by writing over the volatile memory and/or rebooting a processor or controller.

Figure 4:
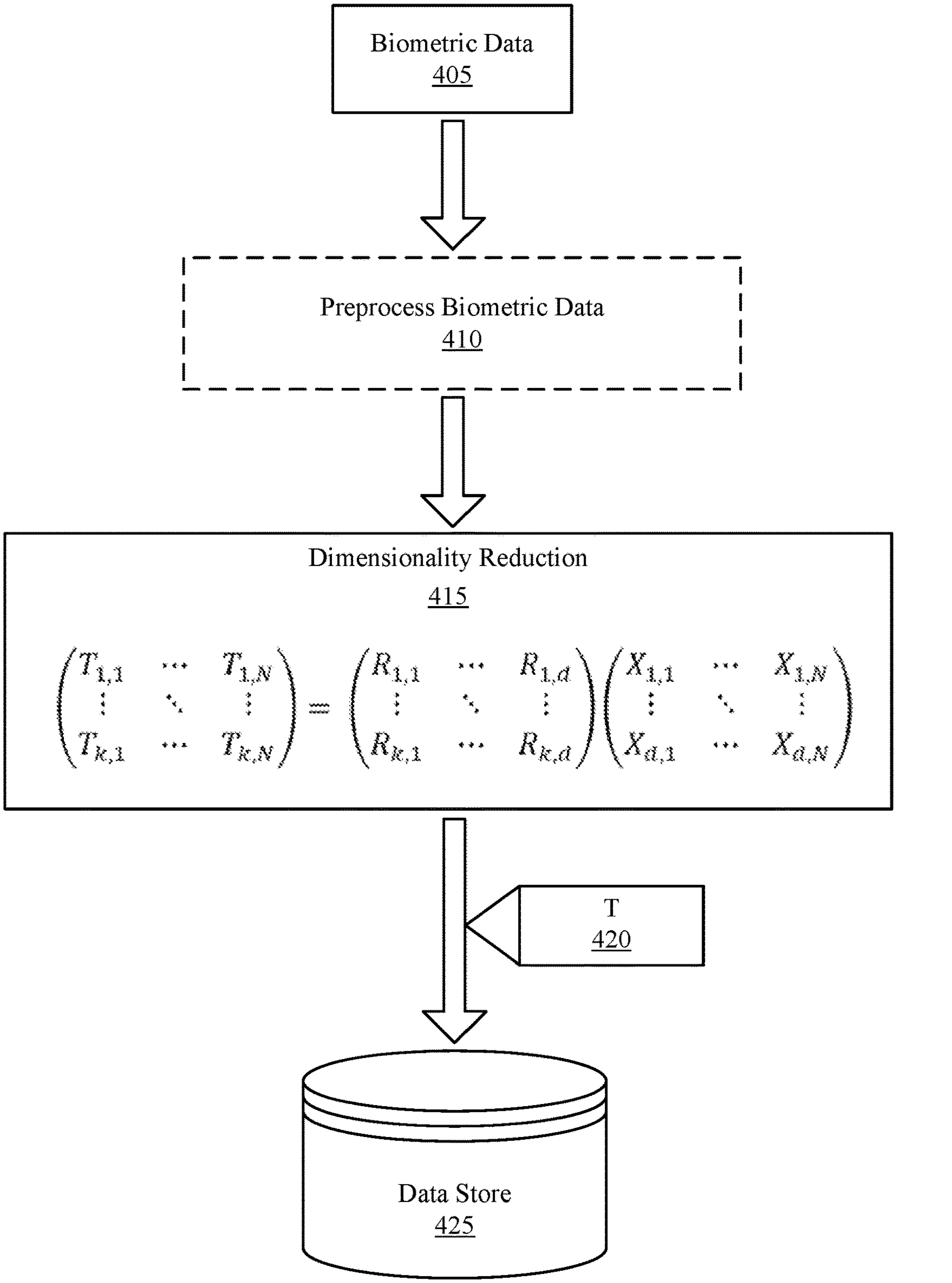
FIG. 4 illustrates an example of a data transformation procedure that supports managing biometric data at a gun in accordance with aspects of the present disclosure.

FIG. 4 illustrates an example of a data transformation procedure 400 that improves user privacy at a biometrically enabled gun. The data transformation procedure 400 may be performed by a component of a gun, such as a data manager.

A data manager may receive biometric data 405, transform the biometric data 405 into transformed biometric data 420, and store the transformed biometric data 420 in the data store 425. The data store 425 may include non-volatile memory, such as read-only memory (ROM), erasable programmable ROM (EPROM), electrically erasable programmable ROM (EEPROM), ferroelectric RAM (FRAM), NOR flash, NAND flash, or the like. The data store 425 may be an aspect of the gun, such as non-volatile memory that is housed within the gun and electrically coupled with the data manager, which may also be housed within the gun. The data manager may receive the biometric data 405 from one or more biometric sensors that collect the biometric data 405 from a user.

At step 410, the data manager may preprocess the biometric data 405. Preprocessing the biometric data 405 may include performing a grayscale transformation on the biometric data 405, normalizing the biometric data 405, performing segmentation on the biometric data 405, performing edge detection on the biometric data 405, performing orientation prediction on the biometric data 405, binarizing the biometric data 405, thinning the biometric data 405, performing feature extraction on the biometric data 405, or any combination thereof.

The data manager may extract a set of features from the biometric data 405. In some examples, the data manager may extract a set of minutiae feature vectors. For example, the data manager may extract 20 feature vectors, 200 feature vectors, or anywhere in between, and each feature vector may include 6 dimensions, 120 dimensions, or anywhere in between. As an illustrative example, each feature vector may correspond to a fingerprint minutiae (e.g., a ridge bifurcation, a ridge island, etc.) and each dimension may correspond information associated with a nearest-neighbor minutiae (e.g., the distance to the nearest neighbor, the number of ridges between the two minutiae points, the orientation of the nearest neighbor with respect to the minutiae, etc.).

The data manager may, for example, extract a set of pixel vectors. For example, the data manager may extract 10,000 feature vectors, 5,000,000 feature vectors, or anywhere in between, and each feature vector may include 256 dimensions, 167,77,216 dimensions, or anywhere in between. As an illustrative example, each feature vector may correspond to a pixel and each dimension may correspond to a grayscale value for the pixel. The data manager may reduce the number of pixels in the biometric data 405 by performing segmentation on the image to identify relevant pixels (e.g., pixels that make up a face, pixels that make up an iris, pixels that make up a fingerprint, etc.), and the irrelevant pixels may be discarded and/or not included in the dimensionality reduction.

As an illustrative example, the extracted features may include ridge characteristics (e.g., ridge endings, ridge bifurcations, ridge islands, ridge lakes, etc.), scars, pores, local binary patterns, histogram of gradients, speeder robust features, facial characteristics (e.g., mouth geometry, nose geometry, etc.), Fisher vectors, eigenvectors, image texture, features produced by Gabor wavelets, or the like. As another example, an artificial neural network (such as a convolutional neural network (CNN)) may extract features as part of a training procedure, and the features may be encoded in the artificial neural network as node weights. As another example, the biometric data 405 may be filtered at step 410 to produce features. For example, Gabor filters (e.g., two dimensional Gabor filters, Ateb-Gabor filters, etc.) may be applied to the biometric data 405 to produce the set of features.

In some examples, the data manager may generate intermediate query features. For example, the data manager may apply a function to the extracted features to generate a set of intermediate query features, and the dimensionality reduction may be performed on the set of intermediate query features. As an illustrative example, for each query feature, each dimension may be associated with a tuple of two or more data points, and the tuple of two or more data points may be converted into a single data point for the given dimension of the given feature. Each tuple of two or more data points may be converted into a single data point according to a pairing function, such as the Cantor pairing function or the Cantor tuple function.

In some examples, the data manager may generate an index vector. For example, the data manager may generate an index vector based on the biometric data 405, and the index vector may be used to construct a projection matrix. For example, the biometric data 405 may be processed to determine a seed value for a pseudo-random number generator, and the elements of the projection matrix may be selected according to the pseudo-random number generator initialized with the seed value. As an illustrative example, the data manager may calculate the seed value as the number of minutiae present in the biometric data 405, the number of ridges between minutiae present in the biometric data 405, or the number of pixels in the biometric data 405 associated with a predetermined grayscale value (e.g., 0, 32, 64, 128, 250, 256, etc.). In some examples, the data manger may generate the projection matrix as a dynamic random projection matrix.

At step 415, the data manager may transform the biometric data 405 by performing a dimensionality reduction of the biometric data 405. The dimensionality reduction techniques described herein preserve the similarity structure of the biometric data 405, as the distance between any points in the biometric data 405 is preserved such that the distance between the same points in the transformed biometric data is approximately the same. This distance preservation comes from the Johnson-Lindenstrauss lemma, which states that for any 0<ε<1 and any integer "n," let "k" be a positive integer such $$k \geq 4\left(\frac{\varepsilon^2}{2} - \frac{\varepsilon^3}{3}\right)^{-1}$$

ln(n), then for any set "V" of "n" points in $\mathbb{R}^d$, there is a map $f:\mathbb{R}^d \rightarrow \mathbb{R}^k$ such that for all "u" and "v" in "V," $(1-\varepsilon)\|u-v\|^2 \leq \|f(u)-f(v)\|^2 \leq (1+\varepsilon)\|u-v\|^2$ where f(u) and f (v) are the projections of "u" and "v." As shown by the Johnson-Lindenstrauss lemma, an orthogonal projection of "n" points into a lower dimension subspace preserves the distance between points such that the distance between points in the original space as compared to the distance between the points in the subspace is not distorted more than a factor of $1\pm\mathcal{E}$, for $0<\mathcal{E}<1$.

The vectors of the projection matrix may be orthogonal or approximate orthogonality. In some examples, data manager may perform the Gram-Schmidt process to orthogonalize the vectors of the projection matrix. In other examples, the elements of the projection matrix may be randomly selected from a distribution with zero mean and unit variance to approximate orthogonal vector. The vectors (e.g., the column vectors) in the projection matrix may, in some cases, have unit length. As shown by Hecht-Neilsen, since there are many more almost orthogonal directions than actual orthogonal directions in high dimensional space, randomly selecting the vectors produces approximately orthogonal vectors such that $R^T R \approx R_I$, where $R_I$ is the identify matrix. As such, the elements of the projection matrix may be chosen independently from an identical distribution having zero mean and unit variance to produce a projection matrix containing approximately orthogonal vectors in a computationally efficient manner.

In some examples, the projection matrix may be generated as a sparse matrix, which may reduce computational cost and therefore decrease system latency. As an illustrative example, the elements of the projection matrix ($r_{i,j}$) may be chosen from the distribution:

$$r_{i,j} = \begin{cases} +1 \text{ with probability } \frac{1}{2} \\ -1 \text{ with probability } \frac{1}{2} \end{cases}.$$

As another illustrative example, the elements of the projection matrix ($r_{i,j}$) may be chosen from distribution $$r_{i,j} = \sqrt{3}\begin{cases} +1 \text{ with probability } \frac{1}{2} \\ 0 \text{ with probability } \frac{2}{3} \\ 1- \text{ with probability } \frac{1}{6} \end{cases}$$

to produce a sparse matrix and therefore reduce the computational complexity of reducing the dimensionality of biometric data.

The data manager may store the transformed biometric data 420 in the data store 425. The data store may be an example of non-volatile memory of the gun, such as non-volatile memory located on a circuit board inside the gun.

Figure 5:
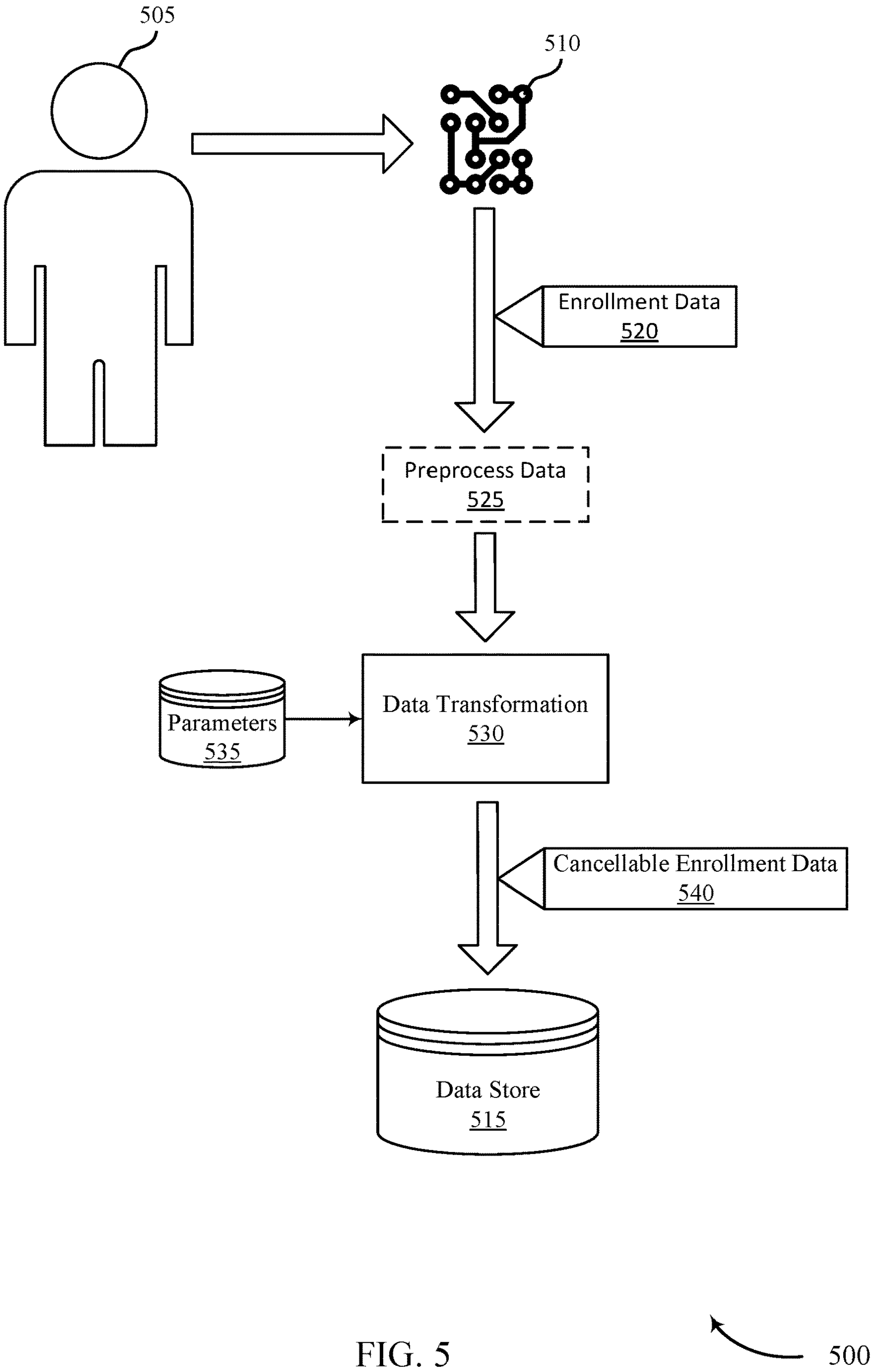
FIG. 5 illustrates examples of a user enrollment procedure that supports enrolling a user at a gun in accordance with aspects of the present disclosure.

FIG. 5 illustrates an example of a user enrollment procedure 500 that improves user privacy at a biometrically enabled gun. The user enrollment procedure 500 may be performed by a component of a gun, such as a data manager.

The user enrollment procedure 500 illustrates a user 505, a biometric sensor 510, and a data store 515. The user 505 may be the owner of the gun that includes the biometric sensor 510, or the user 505 may be an individual that the owner intends to give access to such that the user 505 can operate the gun. The biometric sensor 510 may be example of a fingerprint scanner, a palmprint scanner, a vein pattern scanner, a camera, an image sensor, an impedance sensor, an electrocardiogram sensor, or the like. The biometric sensor 510 may collect biometric data from the user 505, and a data manager may process the biometric data. The biometric data collected as part of the user enrollment procedure 500 may be referred to as enrollment data.

The enrollment data 520 may be collected by the biometric sensor 510. At step 525, the enrollment data 520 may be preprocessed. The enrollment data 520 may include biometric enrollment data (e.g., fingerprint data, facial data, vein pattern data, iris data, EKG data, etc.), and the gun may perform binarization, segmentation, or feature extraction on the enrollment data 520. Preprocessing the enrollment data 520 may improve the quality of the data. As an illustrative example, the enrollment data 520 may include fingerprint data, and the preprocessing of the fingerprint data may include binarizing (e.g., thresholding) the fingerprint data and extracting a set of features (e.g., minutiae data, pixel data, etc.) from the binarized fingerprint data. As another example, the enrollment data 520 may include facial data, and the preprocessing of the facial data may include detecting a face and segmenting the face. In some cases, preprocessing the enrollment data 520 may include extracting a set of features, and the set of features may be extracted according to local binary patterns, Fisher vectors, eigenvectors, a principal component analysis, a Histogram of Gradient, Bag of Words, or the like.

At step 530, the enrollment data 520 may be transformed according to a one-way function (e.g., a non-invertible function). For example, the enrollment data 520 may undergo a dimensionality reduction to produce the cancellable enrollment data 540, and the cancellable enrollment data 540 may be stored in the data store 515.

The enrollment data 520 may be transformed into the cancellable enrollment data 540 based on the parameters 535 and the one-way function. The parameters 535 may include a projection matrix containing vectors that are orthogonal or approximately orthogonal. The vectors of the projection matrix may be considered approximately orthogonal when independently selected from an identical distribution of zero mean and unit variance. The projection matrix may be multiplied with the enrollment data 520 to project the enrollment data 520 into a subspace and produce the cancellable enrollment data 540.

In some examples, the projection matrix may include orthogonal vectors. For example, the Gram-Schmidt orthogonalizing process may be performed to produce orthogonal vectors. In other examples, the vectors in the matrix may be approximately orthogonal. For example, the elements of the projection matrix may be selected from a distribution of zero mean and unit variance. The enrollment data 520 may be discarded, thereby improving data security and user privacy, as any data retrieved from the data store 515 will contain data that has been transformed according to the one-way function.

Figure 6:
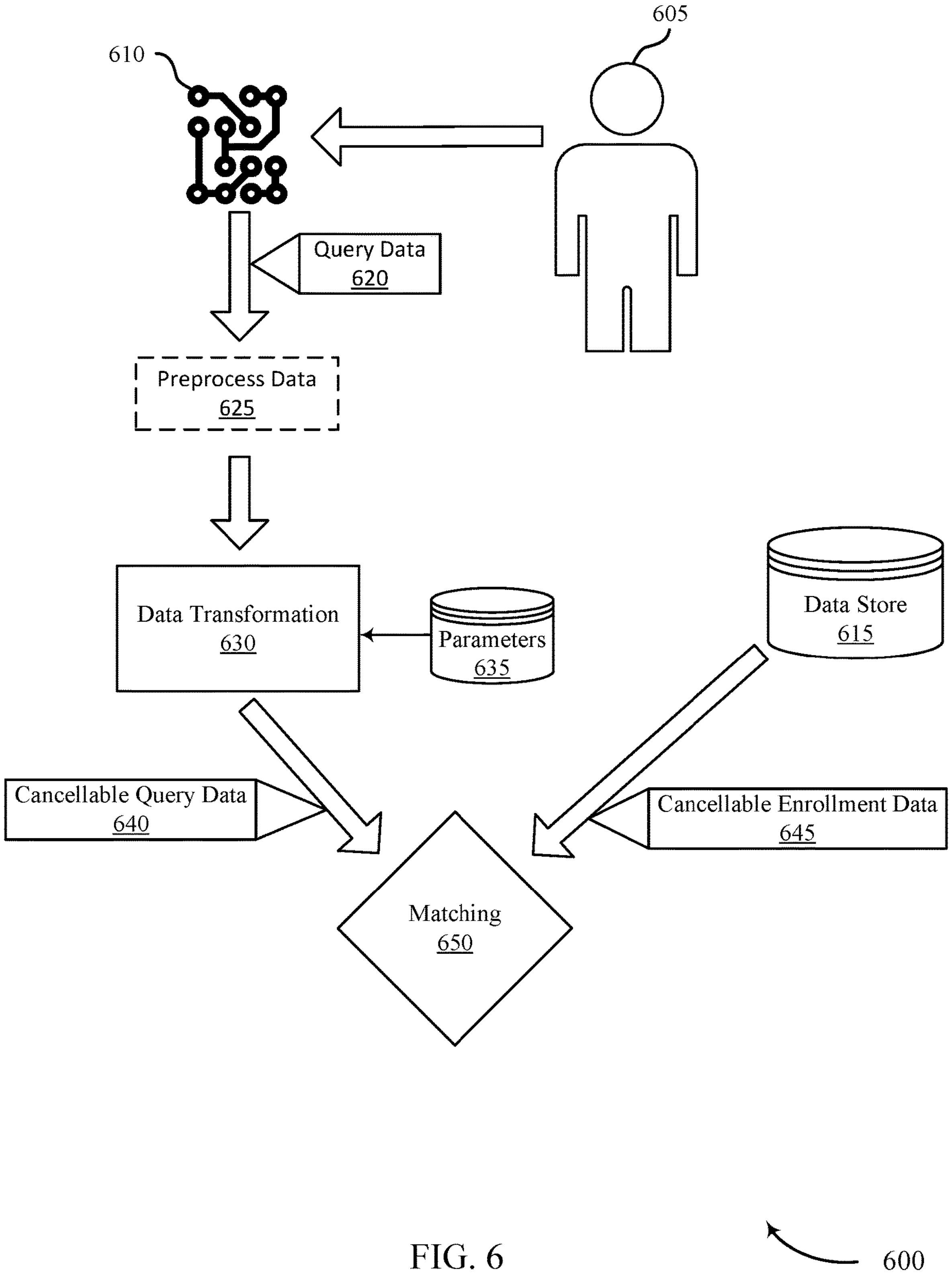
FIG. 6 illustrates an example of a user authentication procedure that supports authenticating a user at a gun in accordance with aspects of the present disclosure.

FIG. 6 illustrates an example of a user authentication procedure 600 that improves user privacy at a biometrically enabled gun. The user authentication procedure 600 may be performed by a component of a gun, such as a data manager.

The user authentication procedure 600 illustrates a user 605, a biometric sensor 610, and a data store 615. The authentication sensor 610 may be an example of a component that supports collecting biometric data, such as a fingerprint scanner, a palmprint scanner, a vein pattern scanner, a camera, an image sensor, an impedance sensor, an electrocardiogram (EKG) sensor, or the like. The biometric sensor 610 may collect biometric data from the user 605, and a data manager may process the biometric data. The biometric data collected as part of the user authentication procedure 600 may be referred to as query data.

The query data 620 may be collected by the biometric sensor 610. At step 625, the query data 620 may be preprocessed. The query data 620 may include biometric authentication data (e.g., fingerprint data, facial data, vein pattern data, iris data, EKG data, etc.), and the gun may perform binarization, segmentation, or feature extraction on the query data 620. Preprocessing the query data 620 may improve the quality of the data. As an illustrative example, the query data 620 may include fingerprint data, and the preprocessing of the fingerprint data may include binarizing (e.g., thresholding) the fingerprint data and extracting a set of features (e.g., minutiae data) from the binarized fingerprint data. As another example, the query data 620 may include facial data, and the preprocessing of the facial data may include detecting a face and segmenting the face. In some cases, preprocessing the query data 620 may include extracting a set of features, and the set of features may be extracted according to local binary patterns, Fisher vectors, eigenvectors, a principal component analysis, a Histogram of Gradient, Bag of Words, or the like.

In some examples, the type of features extracted from the query data 620 may be based on the type of biometric data included in the query data 620. For example, the query data 620 may be received from a fingerprint scanner and a data manager may extract features based on ridge characteristics (also referred to as "minutiae"). In another example, the query data 620 may be received from a camera as part of a facial recognition procedure and the data manager may extract features corresponding to facial characteristics, image pixels, eigenvectors, Fisher vectors, or the like.

At step 630, the query data 620 may be transformed according to a one-way function (e.g., a non-invertible function). For example, the query data 620 may undergo a dimensionality reduction to produce the cancellable query data 640, and the cancellable query data 640 may be compared to the cancellable enrollment data 645 to determine whether the user 605 is an valid user of the gun. The cancellable enrollment data 645 may be generated as part of a user enrollment procedure and stored in the data store 615. A valid user corresponds to a user that is approved to operate the gun. A user that has enrolled biometric data on the gun is an example of a valid user.

The query data 620 may be transformed into the cancellable query data 640 based on the parameters 635 and the one-way function. The parameters 635 may include a projection matrix with vectors that are orthogonal or approximately orthogonal. The vectors of the random projection matrix may be considered approximately orthogonal when independently selected from an identical distribution of zero mean and unit variance. The projection matrix may be multiplied with the query data 620 to project the query data 620 into a subspace and produce the cancellable query data 640.

In some examples, the random projection matrix may include orthogonal vectors. For example, the Gram-Schmidt orthogonalizing process may be performed to produce orthogonal vectors. In other examples, the vectors in the matrix may be approximately orthogonal. For example, the elements of the random projection matrix may be selected from a distribution of zero mean and unit variance. The query data 620 may be discarded, thereby improving data security and user privacy, as any data retrieved from the data store 615 will contain data that has been transformed according to a one-way function.

A matching procedure is performed at step 650 to determine whether the cancellable query data 640 matches the cancellable enrollment data 645. As part of the matching procedure, the data manager may generate a similarity score indicating the similarity between the cancellable query data 640 and the cancellable enrollment data 645. The similar score may be a normalized value between zero and one, where zero indicates that the cancellable query data 640 and cancellable enrollment data 645 are dissimilar, and where one indicates that the cancellable query data 640 and cancellable enrollment data 645 are similar. The cancellable query data 640 and/or the cancellable enrollment data 645 may include features such as texture, shape, minutiae, eigenvectors, features produced by Gabor wavelets, or features produced by an artificial neural network. As an example, a distance (e.g., Euclidean distance, Manhattan distance, Mahalanobis distance, etc.) distance may be calculated between the cancellable query data 640 and the cancellable enrollment data 645, and the similarity score may expressed by 1−distance.

The distance may, for example, be calculated as a scaled Euclidean distance, as shown by $$\sqrt{\frac{d}{k}}|TQ_{x_1} - TE_{x_1}|,$$

where "d" is the dimensionality of the query data 620, "k" is the dimensionality of the cancellable query data 640, "$TQ_{x_1}$" is a point in the Euclidean space of the cancellable query data 640, and "$TE_{x_1}$" is a point in the Euclidean space of the cancellable enrollment data 645. As another example, the similarity score may be generated by calculating the cosine similarity, the Dice similarity, the Jaccard similarity, or MinHash similarity of the cancellable query data 640 and the cancellable enrollment data 645. In some examples, the data manager may calculate a local similarity score for each feature vector in the cancellable query data 640. In such examples, the similarity score indicting the similarity between the cancellable query data 640 and cancellable enrollment data 645 may be referred to as a global similarity score, and the global similarity score be expressed as the average local similarity score, the median local similarity score, or $$\frac{2*m}{(q+e)},$$

where "m" is the number of feature matches, "q" is the number of query features in the transformed set of query features, and "e" is the number of enrollment features in the transformed set of enrollment features. As another example, the global similarity score may be expressed by $$\frac{2*m}{(qo+eo)}$$

where "m" is the number of feature matches, "qo" is the number of query features in the transformed set of query features that are also present in the transformed set of enrollment features, and "e" is the number of enrollment features in the transformed set of enrollment features that are also present in the transformed set of query features. As an illustrative example, a feature may be considered present in both the cancellable query data 640 and the cancellable enrollment data 645 based on the local similarity score for the feature being greater than a dynamic local similarity threshold, such as the average similarity score of the features present in the query data, or based on the local similarity score for the feature being greater than a predetermined local similarity threshold, such as 0.75, 0.8, 0.85, 0.9, 0.95, 0.98, 0.99, 0.995, 0.999, or 0.9999.

As another example, an artificial neural network may be used to generate a similarity score. The artificial neural network used to generate the similarity score may be an example of a regression model, a classification model, or a ranking model. An example of a ranking model is a Siamese model. The artificial neural network that generates the similarity score may be referred to as a similarity model. The similarity model may undergo a training procedure, where training data is fed into the similarity model, the model generates an output, and the weights of the model are updated based on the output. The weights of the model may be updated based on a backpropagation procedure that aids in calculating the gradient of the loss function with respect to the loss, and the weights may be adjusted according to a step size such that the loss is reduced. As an illustrative example, a feature extraction model (e.g., a CNN) may be used to extract query features from the query data 620, the extracted query features may be undergo a transformation to produce the cancellable query data 640, and the similarity model may (e.g., a Siamese model) may produce a similarity score for the cancellable query data 640 with respect to the cancellable enrollment data 645. In other words, a similarity model may take two inputs (e.g., two sets of transformed biometric data, two sets of features, etc.) and produce one output (e.g., a similarity score, a distance value, etc.).

The data manager may compare the similarity score against a similarity threshold. The data manager may identify a match at step 650 based on the similarity score being greater than or equation to the similarity threshold, and the data manager may identify a mismatch based on the similarity score being less than the similarity threshold. In some examples, the data manager may identify a match based on the similarity score satisfying a similarity threshold (e.g., the similarity score being greater than or equal to a similarity score of 0.99), and the data manager may identify a mismatch based on the similarity score satisfying a dissimilarity threshold (e.g., the similarity score being less than a similarity score of 0.99).

A match indicates that the cancellable query data 640 and cancellable enrollment data 645 are determined as being biometric samples of the same biometric feature, meaning the user 605 has enrolled the biometric feature as part of a user enrollment procedure. In other words, a match may indicate that the user 605 is authorized to operate the gun. In some examples, the gun may support the creation of temporary users, and the data manager may determine whether the user 605 is an active user or an inactive user. In such examples, a match may indicate that the user 605 has enrolled biometric data on the gun and that the user 605 is a valid user (e.g., an active user or a user that is authorized to use the gun). The data manager may determine that the user 605 is a valid user by identifying an indication of an active status (e.g., a data value stored in memory of the gun) for the user 605. In other words, the data manager may determine that the user 605 is a valid user by identifying a data flag (e.g., a Boolean value) that is associated with the cancellable enrollment data 645 and indicates a valid (e.g., approved, authorized, active) user status.

Figure 7:
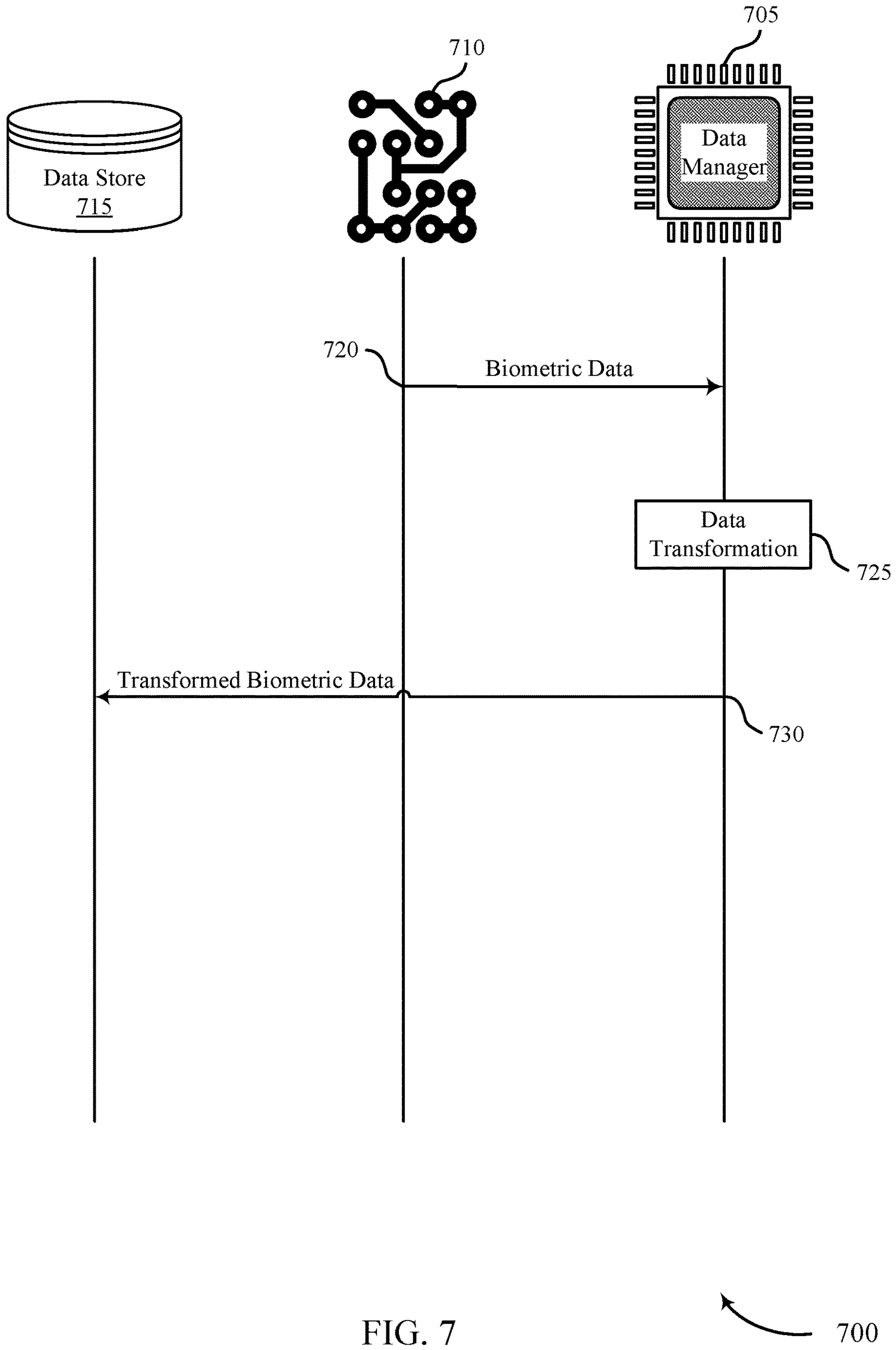
FIG. 7 illustrates an example of a process flow that supports managing biometric data at a gun in accordance with aspects of the present disclosure.

FIG. 7 illustrates an example of a process flow 700 that improves user privacy at a biometrically enabled gun. The process flow 700 includes a data manager 705, a biometric sensor 710, and a data store 715, which may be examples of the corresponding components described with reference to FIGS. 1 through 6. Alternative examples of the following may be implemented, where some steps are performed in a different order than described or are not performed at all. In some cases, steps may include additional features not mentioned below, or further steps may be added.

At step 720, the data manager 705 may receive biometric data from the biometric sensor 710. The data manager 705 may preprocess the biometric data to generate a set of features based on the biometric data. In some examples, the data manager 705 may determine the type of features to generate based on the type of biometric data and/or based on the type of biometric sensor 710. For example, the data manager 705 may generate three-dimensional mapping features based on the biometric sensor 710 being an example of a dot projector, the data manager 705 may generate minutiae features based on the biometric sensor 710 being an example of a fingerprint scanner, or the data manager 705 may generate pixel features based on the biometric data including a digital representation of an iris (e.g., an image of an eye, a pixel matrix representing an iris, etc.).

At step 725, the data manager 705 may perform a data transformation on the biometric data. In some examples, the data transformation may be performed in a trusted environment, such as Arm® TrustZone®. The data transformation may be an example of a one-way function that reduces the dimensionality of the biometric data. For example, the data manager 705 may project the biometric data into a lower dimensional subspace according to a projection matrix including orthogonal vectors, or the data manager 705 may approximate a projection of the biometric data into a lower dimensional subspace according to a projection matrix including approximately orthogonal vectors. The approximately orthogonal vectors may include elements independently selected from an identical distribution with zero mean and unit variance. A matrix including orthogonal or approximately orthogonal vectors may be referred to as a random matrix herein. In some examples, the vectors of the projection matrix may be of unit length.

At step 730, the biometric data may be stored in the data store 715. For example, the data manager 705 may transmit a message including the transformed biometric data to the data store 715, and the data store 715 may store the transformed biometric data. The data store 715 may include non-volatile memory.

Figure 8:
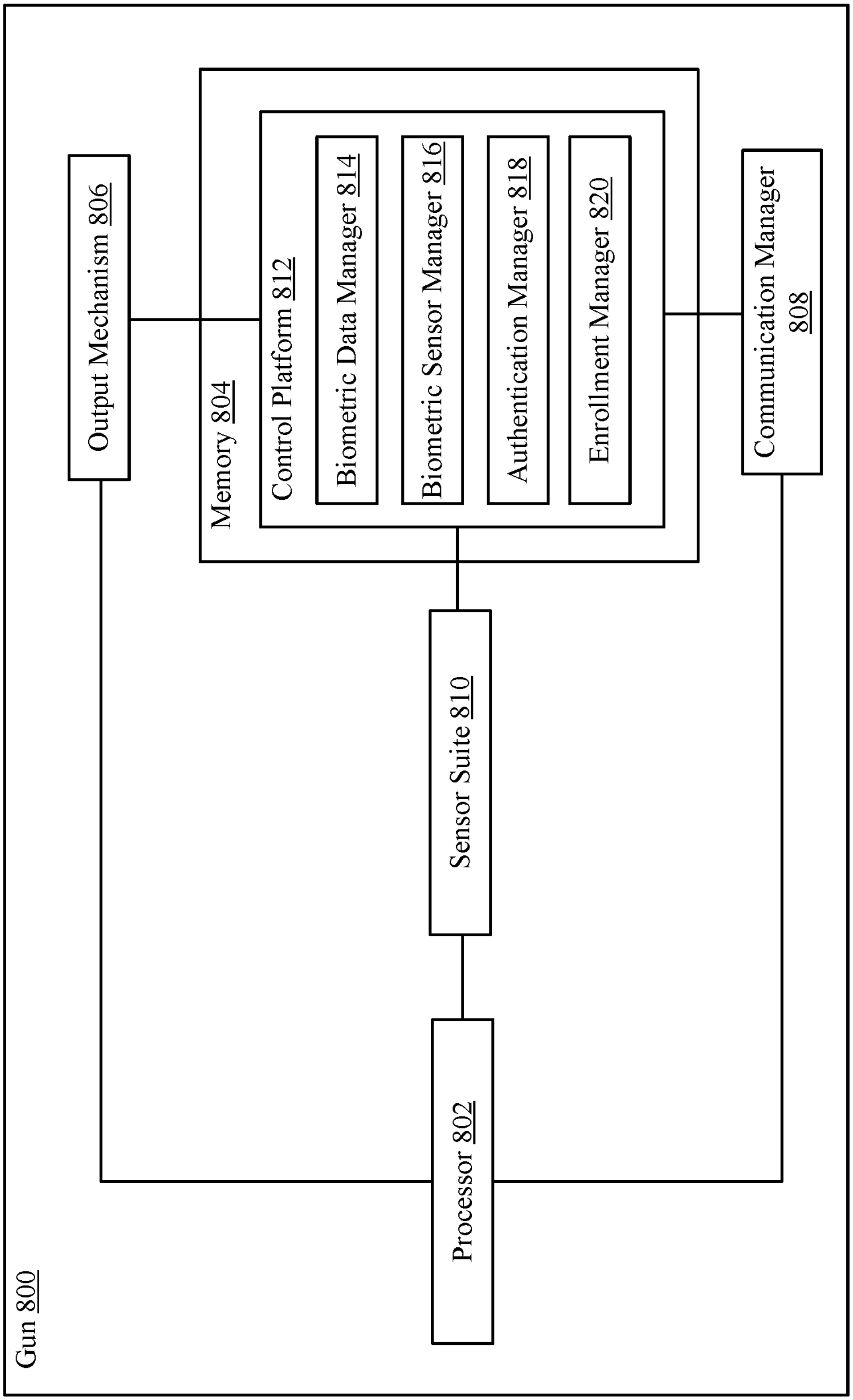
FIG. 8 illustrates an example of a gun that supports managing biometric data in accordance with aspects of the present disclosure.

FIG. 8 illustrates an example of a gun 800 able to implement a control platform 812 designed to produce outputs that are helpful in ensuring the gun 800 is used in an appropriate manner. As further discussed below, the control platform 812 (also referred to as a "management platform" or a "data manager") may be designed to receive biometric data, transform the biometric data, store the biometric data, authenticate a user based on the biometric data, or transition the gun 800 into a state, such as an unlocked state and a locked state. Because the control platform 812 may be responsible for managing and processing data at the gun 800, the control platform 812 may also be referred to as a "controller."

In some embodiments, the control platform 812 is embodied as a computer program that is executed by the gun 800. In other embodiments, the control platform 812 is embodied as a computer program that is executed by a computing device to which the gun 800 is communicatively connected. In such embodiments, the gun 800 may transmit relevant information to the computing device for processing as further discussed below. Those skilled in the art will recognize that aspects of the computer program could also be distributed amongst the gun 800 and computing device.

The gun 800 can include a processor 802, memory 804, output mechanism 806, and communication manager 808. The processor 802 can have generic characteristics similar to general-purpose processors, or the processor 802 may be an application-specific integrated circuit (ASIC) that provides control functions to the gun 800. As shown in FIG. 8, the processor 802 can be coupled with all components of the gun 800, either directly or indirectly, for communication purposes.

The memory 804 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the processor 802, the memory 804 can also store data generated by the processor 802 (e.g., when executing the managers of the control platform 812). Note that the memory 804 is merely an abstract representation of a storage environment. The memory 804 could be comprised of actual memory chips, registers, managers, or electrical circuits.

The output mechanism 806 can be any component that is capable of conveying information to a user of the gun 800. For example, the output mechanism 806 may be a display panel (or simply "display") that includes LEDs, organic LEDs, liquid crystal elements, or electrophoretic elements. Alternatively, the display may simply be a series of illuminants (e.g., LEDs) that are able to indicate the status of the gun 800. Thus, the display may indicate whether the gun 800 is presently in a locked state, unlocked state, etc. As another example, the output mechanism 806 may be a loudspeaker (or simply "speaker") that is able to audibly convey information to the user.

The communication manager 808 may be responsible for managing communications between the components of the gun 800. Additionally or alternatively, the communication manager 808 may be responsible for managing communications with computing devices that are external to the gun 800. Examples of computing devices include mobile phones, tablet computers, wearable electronic devices (e.g., fitness trackers), and network-accessible server systems comprised of computer servers. Accordingly, the communication manager 808 may be wireless communication circuitry that is able to establish communication channels with computing devices. Examples of wireless communication circuitry include integrated circuits (also referred to as "chips") configured for Bluetooth®, Wi-Fi®, Near Field Communication (NFC), and the like.

Sensors are normally implemented in the gun 800. Collectively, these sensors may be referred to as the "sensor suite" 810 of the gun 800. For example, the gun 800 may include a motion sensor whose output is indicative of motion of the gun 800 as a whole. Examples of motion sensors include multi-axis accelerometers and gyroscopes. As another example, the gun 800 may include a proximity sensor whose output is indicative of proximity of the gun 800 to a nearest obstruction within the field of view of the proximity sensor. A proximity sensor may include, for example, an emitter that is able to emit infrared (IR) light and a detector that is able to detect reflected IR light that is returned toward the proximity sensor. A proximity sensor may include an inertial measurement unit (IMU) configured to identify a presence event in response to measuring movement that matches a movement signature of a user presence event, such as a user picking up the gun 800. These types of proximity sensors are sometimes called laser imaging, detection, and ranging (LiDAR) scanners. As another example, the gun 800 may include a fingerprint sensor or camera that generates images which can be used for, for example, biometric authentication. As shown in FIG. 8, outputs produced by the sensor suite 810 may be provided to the control platform 812 for examination or analysis.

For convenience, the control platform 812 may be referred to as a computer program that resides in the memory 804. However, the control platform 812 could be comprised of software, firmware, or hardware components that are implemented in, or accessible to, the gun 800. In accordance with embodiments described herein, the control platform 812 may include a biometric data manager 814, a biometric sensor manager 816, an authentication manager 818, and an enrollment manager 820. As an illustrative example, the biometric data manager 814 may process data generated by, and obtained from, an image sensor, the biometric sensor manager 816 may transmit signals to a biometric sensor to collect biometric data, the authentication manager 818 may process data generated as part of a user authentication procedure, and the enrollment manager 820 may display information on a display panel of the gun to prompt a user supply biometric data as part of a user enrollment procedure. Because the data obtained by these managers may have different formats, structures, and content, the instructions executed by these managers can (and often will) be different. For example, the instructions executed by the biometric data manager 814 to process data generated by an image sensor may be different from the instructions generated the enrollment manager 820 to display information at a display panel. As a specific example, the biometric data manager 814 may implement image processing algorithms (e.g., despeckling, grayscale transformation, etc.) that are not necessary for generating text at a display panel.

Figure 9:
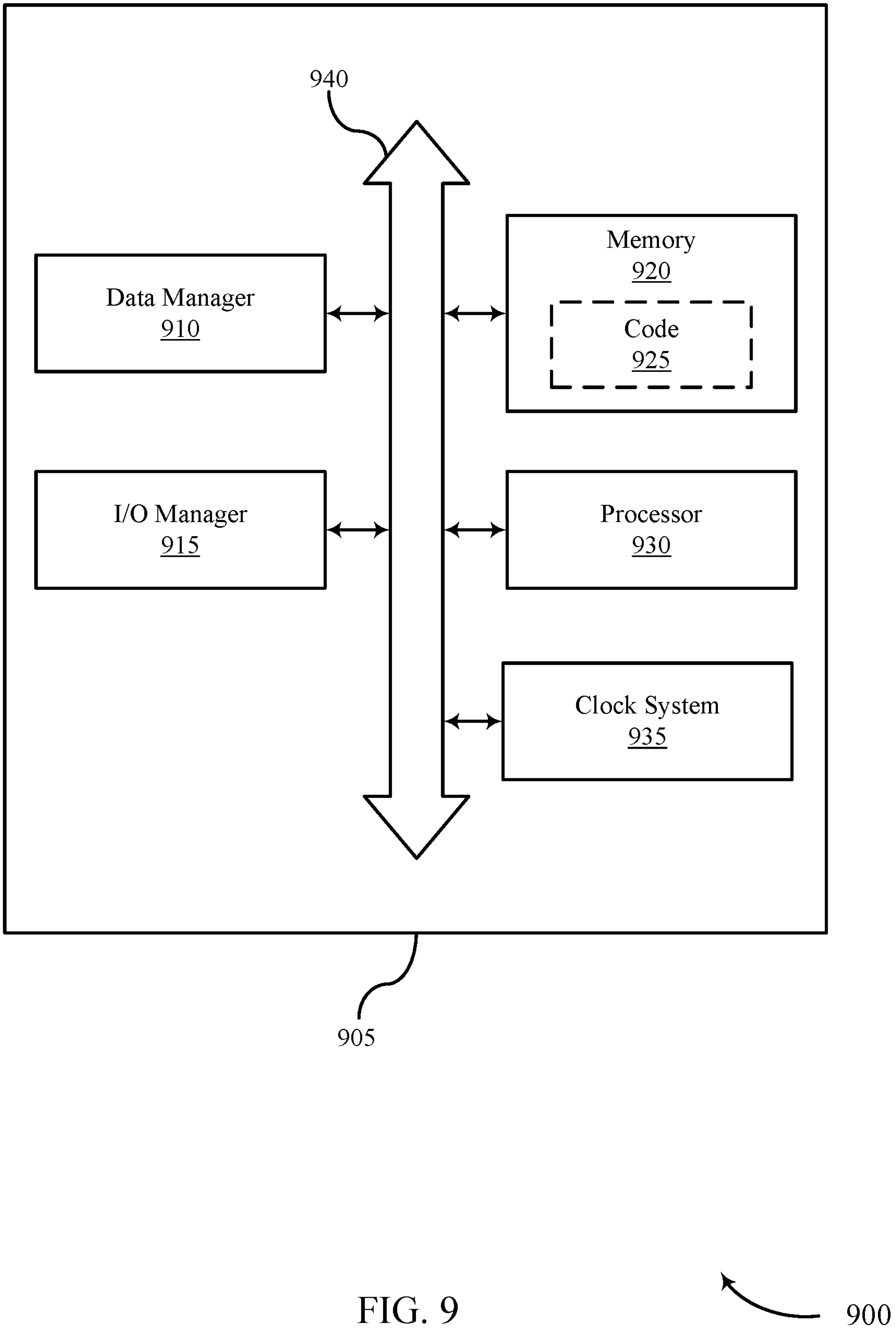
FIG. 9 illustrates an example of a system that supports managing biometric data in accordance with aspects of the present disclosure.

FIG. 9 illustrates an example of a system 900 that supports using biometric data to authenticate a user in accordance with aspects of the present disclosure. The device 905 may be operable to implement the techniques, technology, or systems disclosed herein. The device 905 may include components such as a data manager 910, an input/output (I/O) manager 915, memory 920, code 925, a processor 930, a clock system 935, and a bus 940. The components of the device 905 may communicate via one or more buses 940. The device 905 may be an example of, or include components of, data manager system, a control platform or a gun.

The data manager 910 may gun may receive biometric query data from a biometric sensor, generate a set of query features from the biometric query data, each query feature of the set of query features including a first number of dimensions, and generate a projection matrix, each element of the projection matrix being drawn independently from an identical distribution having zero mean and unit variance. The data manager 910 may transform the set of query features into a transformed set of query features according to the projection matrix, retrieve a transformed set of enrollment features from the memory 920, identify a data match based on the transformed set of query features and the transformed set of enrollment features satisfying a similarity threshold, and transition to an unlocked state in response to the identifying the data match. The unlocked state may allow the device 905 to fire a projectile. For example, in response to the identifying the data match, the device 905 may activate an actuator (e.g., an electromechanical safety mechanism, an electromechanical firing mechanical, etc.) such that the actuator is displaced and allows the device 905 to fire.

The I/O manager 915 may manage input and output signals for the device 905. The I/O manager 915 may also manage various peripherals such an input device (e.g., a button, a switch, a touch screen, a dock, a biometric sensor, a pressure sensor, a heat sensor, a proximity sensor, an RFID sensor, etc.) and an output device (e.g., a monitor, a display, an LED, a speaker, a haptic motor, a heat pipe, etc.).

The memory 920 may include or store code (e.g., software) 925. The memory 920 may include volatile memory, such as random-access memory (RAM) and/or non-volatile memory, such as read-only memory (ROM). The code 925 may be computer-readable and computer-executable, and when executed, the code 925 may cause the processor 930 to perform various operations or functions described here.

The processor 930 may be an example or component of a central processing unit (CPU), an application specific integrated circuit (ASIC), or a field programmable gate array (FPGA). In some embodiments, the processor 930 may utilize an operating system or software such as Microsoft Windows®, iOS®, Android®, Linux®, Unix®, or the like. The clock system 935 control a timer for use by the disclosed embodiments.

The data manager 910, or its sub-components, may be implemented in hardware, software (e.g., software or firmware) executed by a processor, or a combination thereof. The data manager 910, or its sub-components, may be physically located in various positions. For example, in some cases, the data manager 910, or its sub-components may be distributed such that portions of functions are implemented at different physical locations by one or more physical components.

Figure 10:
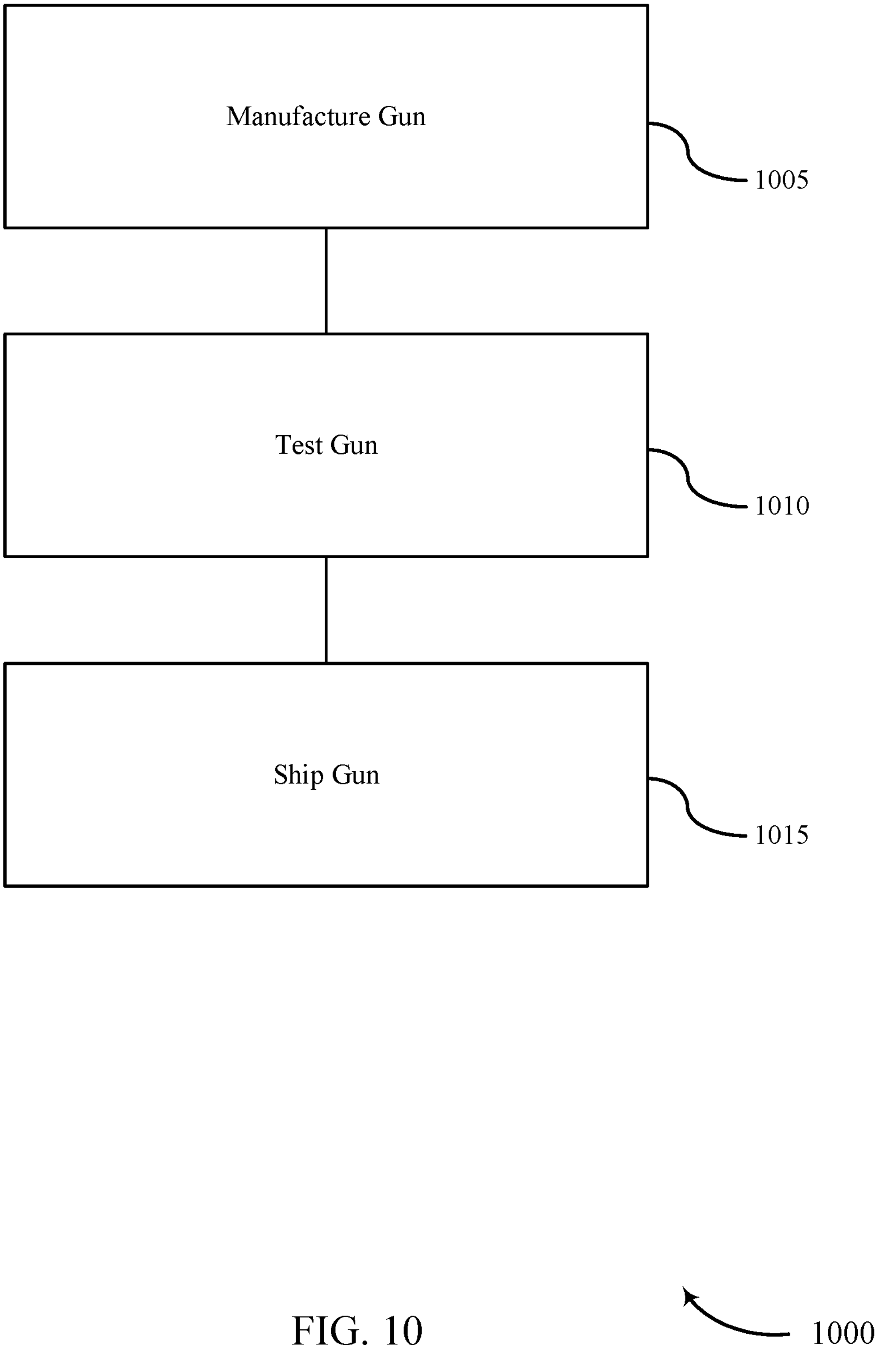
FIG. 10 illustrates an example of a flowchart that supports managing biometric data at a gun in accordance with aspects of the present disclosure.

FIG. 10 illustrates an example of a flowchart 1000 that shows a process by which a gun implementing the systems and techniques described herein is manufactured. Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Initially, a gun manufacturer (or simply "manufacturer") may manufacture a gun that is able to implement aspects of the present disclosure (step 1005). For example, the manufacturer may machine, cut, shape, or otherwise make parts to be included in the gun. Thus, the manufacturer may also design those parts before machining occurs, or the manufacturer may verify designs produced by another entity before machining occurs. Additionally or alternatively, the manufacturer may obtain parts that are manufactured by one or more other entities. Thus, the manufacturer may manufacture the gun from components produced entirely by the manufacturer, components produced by other entities, or a combination thereof. Often, the manufacturer will obtain some parts and make other parts that are assembled together to form the gun (or a component of the gun).

The manufacturer may also develop instructions that support managing biometric data at the gun. For example, the manufacturer may produce software and/or firmware that supports transforming biometric data into transformed biometric data and storing the transformed biometric data in memory of the gun.

In some embodiments, the manufacturer also generates identifying information related to the gun. For example, the manufacturer may etch (e.g., mechanically or chemically), engrave, or otherwise append identifying information onto the gun itself. As another example, the manufacturer may encode at least some identifying information into a data structure that is associated with the gun. For instance, the manufacturer may etch a serial number onto the gun, and the manufacturer may also populate the serial number (and other identifying information) into a data structure for recording or tracking purposes. Examples of identifying information include the make of the gun, the model of the gun, the serial number, the type of projectiles used by the gun, the caliber of those projectiles, the type of firearm, the barrel length, and the like. In some cases, the manufacturer may record a limited amount of identifying information (e.g., only the make, model, and serial number), while in other cases the manufacturer may record a larger amount of identifying information.

The manufacturer may then test the gun (step 1010). In some embodiments, the manufacturer tests all of the guns that are manufactured. In other embodiments, the manufacturer tests a subset of the guns that are manufactured. For example, the manufacturer may randomly or semi-randomly select guns for testing, or the manufacturer may select guns for testing in accordance with a predefined pattern (e.g., one test per 5 guns, 10 guns, or 100 guns). Moreover, the manufacturer may test the gun in its entirety, or the manufacturer may test a subset of its components. For example, the manufacturer may test the component(s) that it manufactures. As another example, the manufacturer may test newly designed components or randomly selected components. Thus, the manufacturer could test select component(s)

of the gun, or the manufacturer could test the gun as a whole. For example, the manufacturer may test the barrel to verify that it meets a precision threshold and the cartridge feed system to verify that it meets a reliability threshold. As another example, the manufacturer may test a group of guns (e.g., all guns manufactured during an interval of time, guns selected at random over an interval of time, etc.) to ensure that those guns fire at a sufficiently high pressure (e.g., 70,000 pounds per square inch (PSI)) to verify that a safety threshold is met.

In some examples, the manufacturer may test electrical components of the gun, such as a data manager or biometric sensor. For example, the manufacturer may deploy a set of instructions (e.g., software or firmware) to a data manager, cycle the data manager on and off, or test the accuracy of a procedure, such as a data authentication procedure, performed by the data manager. The manufacturer may also test the security of the data stored on the gun. For example, the manufacturer may enroll biometric data on the gun and attempt to gain access to the biometric data. In some examples, the manufacturer may provide the gun, the data store, or the software to third-party individuals to perform security audits of the gun.

Testing the gun may include testing software and/or firmware. The manufacturer may test the software and/or firmware to validate the security, performance, or reliability of the software and/or firmware. In some examples, the software may be submitted to one or more third-party entities to audit the software and/or firmware. The software and/or firmware may be tested with emulation tools that simulate the hardware of the gun, or the software and/or firmware may be tested on the actual hardware of the gun. In response to testing, the software and/or firmware may be deployed to the gun.

Thereafter, the manufacturer may ship the gun to a dealer (step 1015). In the event that the gun is a firearm, the manufacturer may ship the gun to a Federal Firearms Licensed (FFL) dealer. For example, a purchaser (also referred to as a "customer") may purchase the apparatus through a digital channel or non-digital channel. Examples of digital channels include web browsers, mobile applications, and desktop applications, while examples of non-digital channels include ordering via the telephone and ordering via a physical storefront. In such a scenario, the gun may be shipped to the FFL dealer so that the purchaser can obtain the gun from the FFL dealer. The FFL dealer may be directly or indirectly associated with the manufacturer of the gun. For example, the FFL dealer may be a representative of the manufacturer, or the FFL dealer may sell and distribute guns on behalf of the manufacturer (and possibly other manufacturers).

Note that while the sequences of the steps performed in the processes described herein are exemplary, the steps can be performed in various sequences and combinations. For example, steps could be added to, or removed from, these processes. Similarly, steps could be replaced or reordered. As an example, the manufacturer may iteratively test components while manufacturing the gun, and therefore perform multiple iterations of steps 1005 and 1010 either sequentially or simultaneously (e.g., one component may be tested while another component is added to the gun). Thus, the descriptions of these processes are intended to be open ended.

Figure 11:
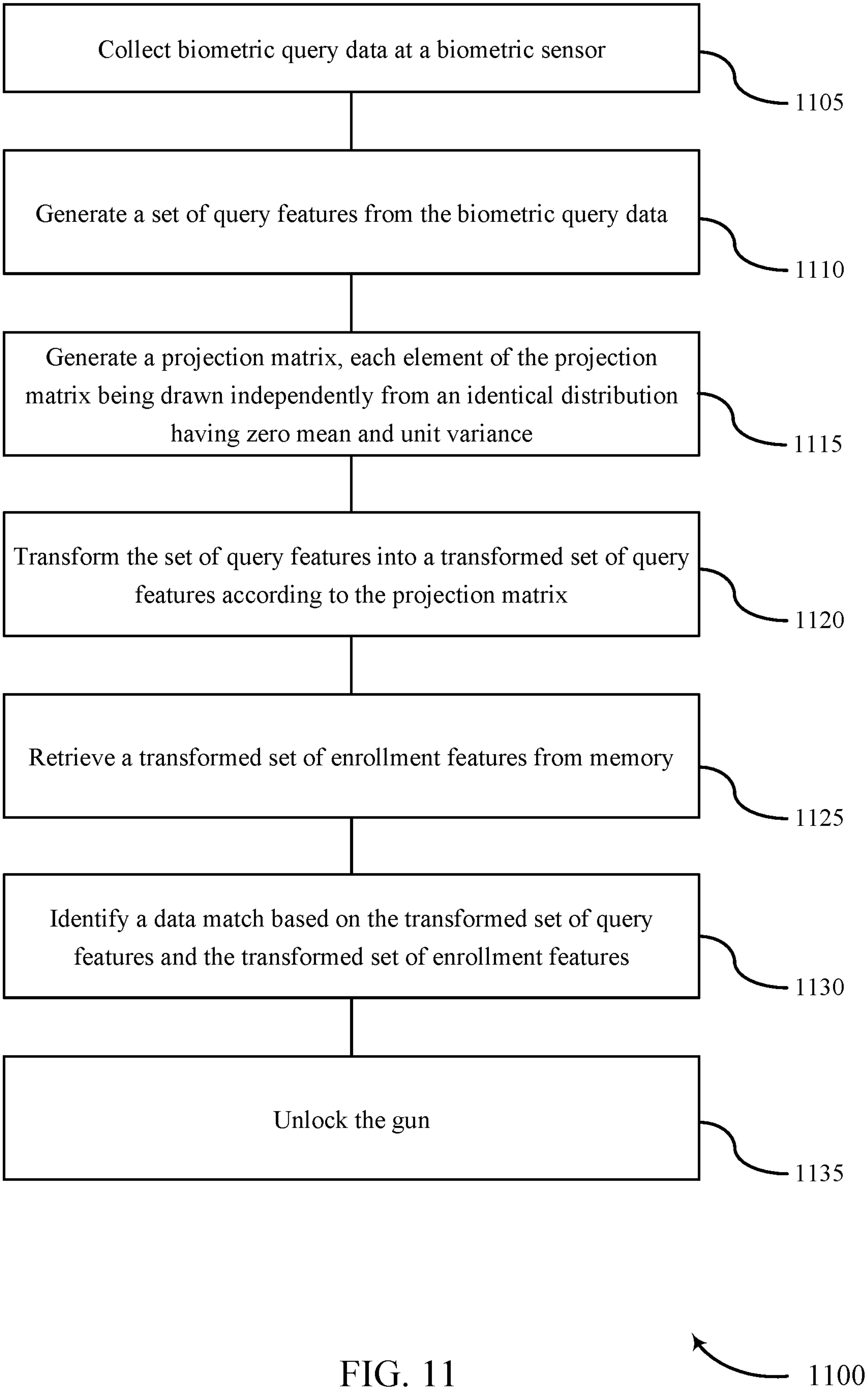
FIG. 11 illustrates an example of a flowchart that supports managing biometric data at a gun in accordance with aspects of the present disclosure.

FIG. 11 shows a flowchart illustrating a method 1100 of using biometric data to authenticate a user while preserving the privacy of the user. The operations of the method 1100 may be implemented by a gun or its components as described herein. For example, the operations of the method 1100 may be performed by a data manager as described with reference to FIGS. 1-10. In some examples, a gun may execute a set of instructions to control the functional elements of the gun to perform the described functions. Additionally or alternatively, the gun may perform aspects of the described functions using special-purpose hardware.

At step 1105, the gun may collect biometric query data at a biometric sensor. For example, a fingerprint scanner may collect fingerprint data and a camera may collect facial data. In some examples, the gun may collect the biometric query data in response to a user presence event, such as a user grasping or picking up the gun.

At step 1110, the gun may generate a set of query features from the biometric query data. In some examples, each query feature of the set of query features may include a first number of dimensions. The set of query features may be generated as part of a feature extraction procedure. In some examples, the set of query feature may be generated in response to preprocessing the biometric query data.

At step 1115, the gun may generate a projection matrix. In some examples, each element of the projection matrix may be drawn independently from an identical distribution having zero mean and unit variance. In some examples, each column vector of the projection matrix is of unit length.

At step 1120, the gun may transform the set of query features into a transformed set of query features according to the projection matrix. For example, the projection matrix may be multiplied with the set of query features to produce a transformed set of query features. The transformed set of query features may be a subspace of the set of query features.

At step 1125, the gun may retrieve a transformed set of enrollment features from memory. The transformed set of enrollment features may be stored in memory of the gun as part of a user enrollment procedure.

At step 1130, the gun may identify a data match based on the transformed set of query features and the transformed set of enrollment features. For example, the gun may generate a similarity score indicating the similarity of the transformed set of query features and the transformed set of enrollment features, and the gun may identify the match based on the similarity score satisfying a similarity threshold.

At step 1135, the gun may be unlocked. In some examples, the gun may be unlocked in response to identifying the data match. In some examples, a signal may be transmitted in response to identifying the data match. For example, the signal may be transmitted to an I/O pin or an actuator of an electromechanical safety.

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Figure 12:
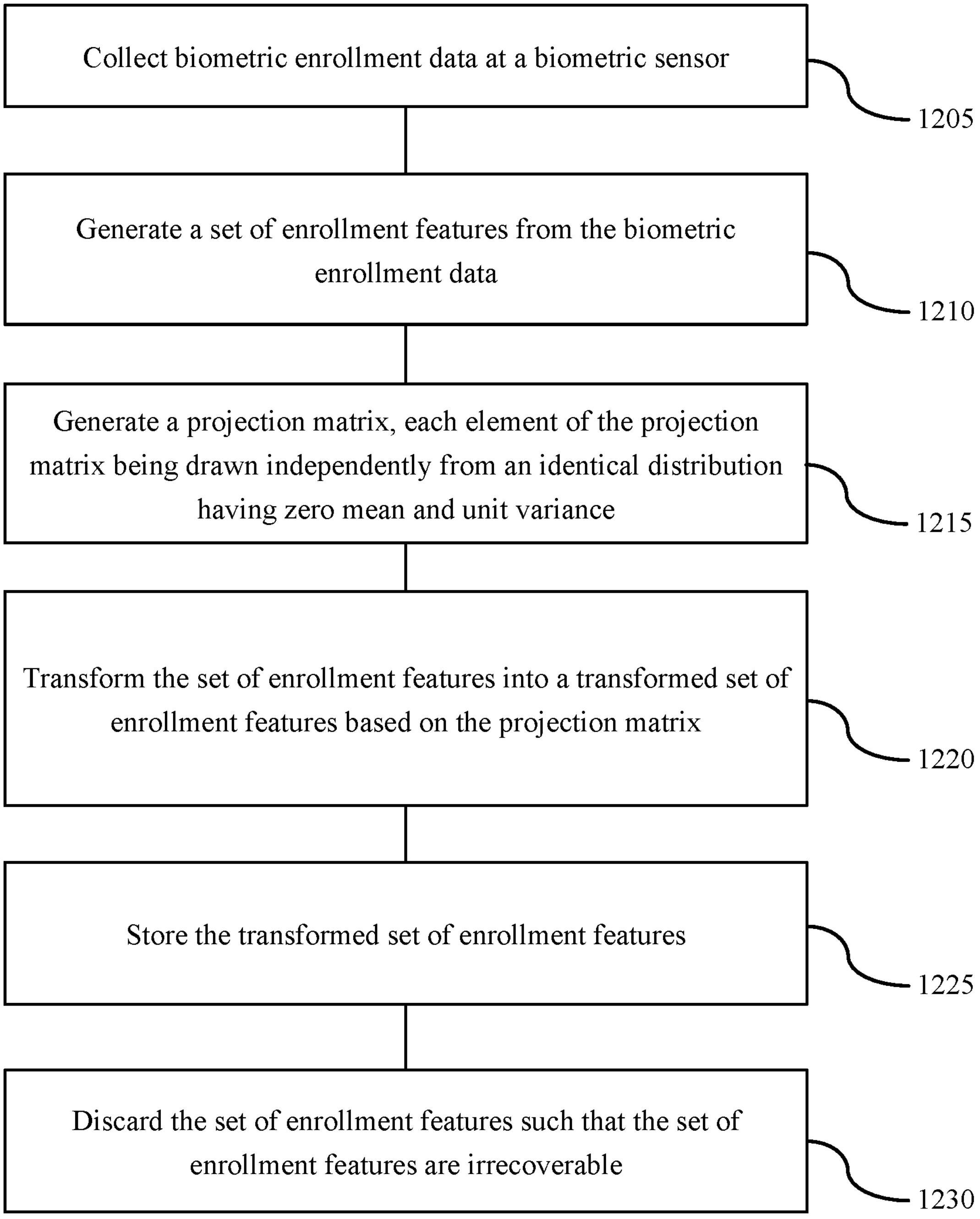
FIG. 12 illustrates an example of a flowchart that supports managing biometric data at a gun in accordance with aspects of the present disclosure.

FIG. 12 shows a flowchart illustrating a method 1200 of using biometric data to enroll a user while preserving the privacy of the user. The operations of the method 1200 may be implemented by a gun or its components as described herein. For example, the operations of the method 1200 may be performed by a data manager as described with reference to FIGS. 1-10. In some examples, a gun may execute a set of instructions to control the functional elements of the gun to perform the described functions. Additionally or alternatively, the gun may perform aspects of the described functions using special-purpose hardware.

At step 1205, the gun may collect biometric enrollment data at a biometric sensor. For example, a fingerprint scanner may collect fingerprint data and a camera may collect facial data. In some examples, the gun may collect the biometric enrollment data in response to a user presence event, such as a user grasping or picking up the gun. In some examples, the gun may collect the biometric enrollment data in response to a user input that initiates a user enrolment procedure.

At step 1210, the gun may generate a set of enrollment features from the biometric enrollment data. In some examples, each query feature of the set of query features may include a first number of dimensions.

At step 1215, the gun may generate a projection matrix. In some examples, each element of the projection matrix may be drawn independently from an identical distribution having zero mean and unit variance.

At step 1220, the gun may transform the set of enrollment features into a transformed set of enrollment features based on the projection matrix. In some examples, the transformed set of enrollment features has the same number of enrollment features as the set of enrollment features.

At step 1225, the gun may store the transformed set of enrollment features. For example, the transformed set of enrollment features may be stored in non-volatile memory of the gun.

At step 1230, the gun may discard the set of enrollment features such that the set of enrollment features are irrecoverable. In some examples, the set of enrollment features may be discarded by flush the memory of the gun. For example, data held in registers or volatile memory may be written over to flush the memory of the gun. As another example, a processor or controller may be reboot to flush the memory of the gun.

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Examples

Several aspects of the present disclosure are set forth examples. Note that, unless otherwise specified, all of these examples can be combined with one another. Accordingly, while a feature may be described in the context of a given example, the feature may be similarly applicable to other examples.

In some examples, the techniques described herein relate to a method for authenticating a user of a gun, the method including: collecting biometric query data at a biometric sensor of the gun; generating a set of query features from the biometric query data, each query feature of the set of query features including a first number of dimensions; generating a projection matrix, each element of the projection matrix being drawn independently from an identical distribution having zero mean and unit variance; transforming, based on the projection matrix, the set of query features into a transformed set of query features, the transformed set of query features having the same number of query features as the set of query features, each query feature of the transformed set of query features including a second number of dimensions that is smaller than the first number of dimensions, wherein a relative distance between query features in the set of query features is approximately the same as a relative distance between the query features in the transformed set of query features; retrieving a transformed set of enrollment features from memory of the gun; identifying a data match based on the transformed set of query features and the transformed set of enrollment features satisfying a similarity threshold; and unlocking the gun in response to the identifying the data match.

In some examples, the techniques described herein relate to a method, further including: generating a similarity score based on the transformed query data and the transformed enrollment data, wherein the identifying the data match is in response to the similarity score satisfying the similarity threshold.

In some examples, the techniques described herein relate to a method, further including: generating a respective local similarity score for each query feature in the transformed set of query features; and determining, for each query feature in the transformed set of query features, whether the respective local similarity score satisfies a local similarity threshold; wherein the generating the similarity score is based on the determining whether the respective local similarity score satisfies the local similarity threshold for each query feature in the transformed set of query features.

In some examples, the similarity score is expressed by $$\frac{2*m}{(q+e)}$$

where "m" is a number of feature matches, "q" is the number of query features in the transformed set of query features, and "e" is the number of enrollment features in the transformed set of enrollment features.

In some examples, the similarity score is expressed by $$\frac{2*m}{(qo+eo)}$$

where "m" is a number of feature matches, "qo" is the number of query features in the transformed set of query features that are also present in the transformed set of enrollment features, and "e" is the number of enrollment features in the transformed set of enrollment features that are also present in the transformed set of query features.

In some examples, the techniques described herein relate to a method, further including: generating a set of intermediate query features by applying a pairing function to each query feature in the set of query features; wherein the transforming the set of query features includes projecting the set of intermediate query features into a lower dimensional subspace according to the projection matrix.

In some examples, the techniques described herein relate to a method, further including: generating an index vector based on the set of query features; wherein the generating the projection matrix includes selecting elements of the of projection matrix based on the elements of the index vector. In some examples, the index vector includes a number of elements that is the same as the number of query features in the set of query features.

In some examples, the unlocking the gun further includes: transmitting a signal to an actuator mechanism, the signal causing the actuator mechanism to disengage a safety mechanism.

In some examples, the safety mechanism includes a firing pin safety, a drop safety, a trigger safety, or a combination thereof.

In some examples, the unlocking the gun further includes: transmitting a signal to an input/output pin of a processor, the signal causing the gun to transition to an unlocked state.

In some examples, the gun is configured to fire in response to a trigger break and the gun being in the unlocked state.

In some examples, the unlocking the gun further includes: charging a capacitor bank in response to unlocking the gun.

In some examples, the techniques described herein relate to a method, further including: identifying a trigger break; and discharging, based on the trigger break and the unlocking the gun, the capacitor bank such that electric charge is directed to an actuator mechanism, resulting in the actuator mechanism activating and the gun firing a projectile.

In some examples, the query biometric data includes fingerprint data, palmprint data, vein pattern data, iris data, facial data, electrocardiogram data, or any combination thereof.

In some examples, the techniques described herein relate to a method for enrolling user biometrics at a gun, the method including: collecting biometric enrollment data at a biometric sensor of the gun; generating a set of enrollment features from the biometric enrollment data, each query feature of the set of query features including a first number of dimensions; generating a projection matrix, each element of the projection matrix being drawn independently from an identical distribution having zero mean and unit variance; transforming, based on the projection matrix, the set of enrollment features into a transformed set of enrollment features, the transformed set of enrollment features having the same number of enrollment features as the set of enrollment features, each enrollment feature of the transformed set of enrollment features including a second number of dimensions that is smaller than the first number of dimensions, wherein a relative distance between enrollment features in the set of enrollment features is approximately the same as a relative distance between the enrollment features in the transformed set of enrollment features; storing the transformed set of enrollment features in non-volatile memory of the gun; and discarding the set of enrollment features such that the set of enrollment features are irrecoverable.

In some examples, the discarding the set of enrollment features further includes: writing data to volatile memory of the gun.

In some examples, the discarding the set of enrollment features further includes: rebooting a processor of the gun such that data held in volatile memory is lost.

In some examples, the techniques described herein relate to a method, further including: generating a set of intermediate enrollment features by applying a pairing function to each query feature in the set of enrollment features; wherein the transforming the set of enrollment features includes projecting the set of intermediate enrollment features into a lower dimensional subspace according to the projection matrix.

In some examples, the techniques described herein relate to a method, further including: generating an index vector based on the set of enrollment features; wherein the generating the projection matrix includes selecting elements of the of projection matrix based on the elements of the index vector.

In some examples, the biometric enrollment data includes fingerprint data, palmprint data, vein pattern data, iris data, facial data, electrocardiogram data, or any combination thereof.

In some examples, the systems and techniques described herein relate to a gun, the gun including: a biometric sensor configured to collect biometric data from a user of the gun; memory in which the biometric data is stored at least temporarily; and a processor that is electronically coupled with both the biometric sensor and the memory, wherein the processor is configured to: retrieve a transformation parameter from the memory in response to the biometric sensor collecting the biometric data; and generate a transformed version of the biometric data by performing dimensionality reduction on the biometric data according to the transformation parameter.

In some examples, the processor is further configured to store the transformed version of the biometric data in the memory; and discard the biometric data in response to storing the transformed version of the biometric data such that the biometric data is irrecoverable.

In some examples, the transformation parameter includes a projection matrix.

In some examples, the gun includes: a random number generator configured to generate a random number, wherein the processor is further configured to generate the projection matrix based on the random number generator.

In some examples, the processor is further configured to generate the projection matrix according to a function that selects elements based on the random number acting as a seed value, wherein the function selects elements from a distribution having zero mean and unit variance.

In some examples, the biometric data comprises fingerprint data, palmprint data, vein pattern data, iris data, facial data, electrocardiogram data, or any combination thereof.

REMARKS

The Detailed Description provided herein, in connection with the appended figures (or drawings), describes example configurations and does not represent all the examples that may be implemented or that are within the scope of the claims. The term "example" used herein means "serving as an illustration or instance," and not "a preferred example."

The functions described herein may be implemented with a controller. A controller may include a data manager, a special-purpose processor, a general-purpose processor, a digital signal processor (DSP), a CPU, a graphics processing unit (GPU), a microprocessor, a tensor processing unit (TPU), a neural processing unit (NPU), an image signal processor (ISP), a hardware security module (HSM), an ASIC, a programmable logic device (such as an FPGA), a state machine, a circuit (such as a circuit including discrete hardware components, analog components, or digital components), or any combination thereof. Some aspects of a controller may be programmable, while other aspects of a control may not be programmable. In some examples, a digital component of a controller may be programmable (such as a CPU), and in some other examples, an analog component of a controller may not be programmable (such as a differential amplifier).

In some cases, instructions or code for the functions described herein may be stored on or transmitted over a computer-readable medium, and components implementing the functions may be physically located at various locations. Computer-readable media includes both non-transitory computer storage media and communication media. A non-transitory storage medium may be any available medium that may be accessed by a computer or component. For example, non-transitory computer-readable media may include RAM, SRAM, DRAM, ROM, EEPROM, flash memory, magnetic storage devices, or any other non-transitory medium that may be used to carry and/or store program code means in the form of instructions and/or data structures. The instructions and/or data structures may be accessed by a special-purpose processor, a general-purpose processor, a manager, or a controller. A computer-readable media may include any combination of the above, and a compute component may include computer-readable media.

A claim is not intended to invoke means-plus-function interpretation (or step-plus-function interpretation) unless the claim uses the phrase "means for" together with an associated function. When a means-plus-function interpretation does apply to a clause in a claim, the given clause is intended to cover the structures describe herein as performing the associated function, including both structural equivalents that operate in the same manner, and equivalent structures that provide the same function.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method for authenticating a user of a gun, the method comprising:
- collecting, at a biometric sensor of the gun, biometric query data that includes a set of vectors, wherein each vector includes a first number of dimensions;
- generating a projection matrix by independently drawing each element from an identical distribution;
- multiplying the biometric query data and the projection matrix, so as to produce transformed biometric query data that includes a same number of vectors as the biometric query data, wherein each vector of the transformed biometric query data includes a second number of dimensions that is smaller than the first number of dimensions;
- retrieving biometric enrollment data from a memory; and
- identifying a data match based on the transformed biometric query data and the biometric enrollment data satisfying a similarity threshold.

2. The method of claim 1, wherein a first relative distance between vectors of the biometric query data is approximately the same as a second relative distance between vectors of the transformed biometric query data.

3. The method of claim 1, further comprising:
- determining, in response to the identifying the data match, that the user is authorized to operate the gun.

4. The method of claim 1, further comprising:
- unlocking, in response to the identifying the data match, the gun by asserting an activation signal, wherein the asserting the activation signal causes a projectile to be fired by the gun.

5. The method of claim 1, further comprising:
- unlocking, in response to the identifying the data match, the gun by disengaging an electromechanical safety mechanism.

6. The method of claim 1, wherein the memory is coupled with the biometric sensor via a physical communication channel.

7. A gun comprising:
- a biometric sensor configured to collect biometric query data from a user of the gun;
- a battery that is located underneath a barrel when the gun is held in an upright position, wherein the pattern is configured to power the biometric sensor;
- memory in which the biometric query data is stored at least temporarily; and
- a processor configured to:
  - retrieve a transformation parameter from the memory in response to the biometric sensor collecting the biometric query data,
  - generate a projection matrix using a function that outputs elements according to a distribution having zero mean and unit variance, wherein each element of the projection matrix is outputted by the function, and
  - generate a transformed version of the biometric query data by performing a data transformation procedure on the biometric query data, wherein the data transformation procedure comprises multiplying the biometric query data and the projection matrix to produce the transformed version of the biometric query data.

8. A gun comprising:
- a biometric sensor configured to collect biometric query data from a user of the gun;
- memory in which the biometric query data is stored at least temporarily;
- a random number generator configured to generate a random number; and
- a processor configured to:
  - retrieve a transformation parameter that comprises a projection matrix from the memory in response to the biometric sensor collecting the biometric query data,
  - generate the projection matrix using a function that outputs elements based on the random number acting as a seed value, wherein the function outputs elements according to a distribution having zero mean and unit variance, and generate a transformed version of the biometric query data by performing dimensionality reduction on the biometric query data using the transformation parameter.

9. The gun of claim 8, wherein the processor is further configured to:

retrieve transformed biometric enrollment data from memory of the gun; and identify a data match based on the transformed version of the biometric query data and the transformed biometric enrollment data satisfying a similarity threshold.

10. The gun of claim 9, wherein the processor is further configured to:

unlock the gun in response to the identifying the data match, wherein the gun is unlocked by transmitting a signal to an actuator mechanism, and wherein the signal causes the actuator mechanism to disengage a safety mechanism.

11. The gun of claim 10, wherein the safety mechanism includes a firing pin safety, a drop safety, a trigger safety, or any combination thereof.

12. The gun of claim 9, wherein the processor is further configured to:

unlock the gun in response to the identifying the data match, wherein the gun is unlocked by transmitting a signal to an input/output pin of a processor, and wherein the signal causes the gun to transition to an unlocked state.

13. The gun of claim 12, wherein the gun is configured to fire in response to a trigger break while the gun is in the unlocked state.

14. The gun of claim 8, wherein the processor is further configured to:

store the transformed version of the biometric query data in the memory; and discard the biometric query data in response to storing the transformed version of the biometric query data such that the biometric query data is irrecoverable.

15. The gun of claim 8, wherein the biometric data comprises fingerprint data, palmprint data, vein pattern data, iris data, facial data, electrocardiogram data, or any combination thereof.

* * * * *